(12) United States Patent  
Kameyama

(10) Patent No.: US 8,462,226 B2  
(45) Date of Patent: Jun. 11, 2013

(54) IMAGE PROCESSING SYSTEM

(75) Inventor: Hirokazu Kameyama, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 98 days.

(21) Appl. No.: 12/900,077

(22) Filed: Oct. 7, 2010

(65) Prior Publication Data

US 2011/0019026 A1 Jan. 27, 2011

Related U.S. Application Data

(63) Continuation of application No. PCT/JP2009/001556, filed on Apr. 2, 2009.

(30) Foreign Application Priority Data

Apr. 8, 2008 (JP) ................................. 2008-100541

(51) Int. Cl.
| H04N 5/228 | (2006.01) |
| H04N 5/225 | (2006.01) |
| H04N 5/222 | (2006.01) |
| G06K 9/00  | (2006.01) |
| G06K 9/46  | (2006.01) |
| G06K 9/66  | (2006.01) |
| G06K 9/36  | (2006.01) |
| G06K 9/20  | (2006.01) |

(52) U.S. Cl.
USPC .................. 348/222.1; 348/207.1; 348/218.1; 348/333.01; 348/333.11; 348/333.12; 382/103; 382/181; 382/190; 382/232; 382/282

(58) Field of Classification Search
USPC ................ 348/207.99, 207.1, 211.14, 218.1, 348/222.1, 239, 333.01–333.05, 333.11, 333.12; 382/103, 162–166, 181, 190–228, 382/232–239, 276, 282–283, 293–294, 118
See application file for complete search history.

(56) References Cited

U.S. PATENT DOCUMENTS

| 2005/0046730 | A1* | 3/2005 | Li ............................. 348/333.12 |
| 2005/0251015 | A1* | 11/2005 | Takikawa et al. ............. 600/407 |
| 2006/0055784 | A1* | 3/2006 | Sugihara et al. ......... 348/207.99 |
| 2006/0104487 | A1* | 5/2006 | Porter et al. ................... 382/118 |
| 2006/0210264 | A1* | 9/2006 | Saga ............................. 396/287 |
| 2006/0274960 | A1* | 12/2006 | Tamaru ......................... 382/274 |
| 2007/0031066 | A1  | 2/2007 | Nakano |

(Continued)

FOREIGN PATENT DOCUMENTS

| JP | 63-111781 A | 5/1988 |
| JP | 7-222145 A  | 8/1995 |

(Continued)

*Primary Examiner* — Michael Osinski  
(74) *Attorney, Agent, or Firm* — Birch, Stewart, Kolasch & Birch, LLP

(57) ABSTRACT

An image processing system providing a monitor image in which an image of a characteristic region is easily viewed. The image processing system includes an image obtaining section that obtains a moving image; a characteristic region information obtaining section that obtains information indicating positions of characteristic regions in a plurality of moving image constituting images included in the moving image; and an image generating section that generates display images having substantially the same size as each other, by reducing or enlarging each of images of the characteristic regions included in the plurality of moving image constituting images, based on the positions indicated by the information obtained by the characteristic region information obtaining section.

30 Claims, 21 Drawing Sheets

U.S. PATENT DOCUMENTS

| | | | |
|---|---|---|---|
| 2007/0098396 A1* | 5/2007 | Watanabe et al. | 396/374 |
| 2008/0024643 A1* | 1/2008 | Kato | 348/333.01 |
| 2008/0068487 A1* | 3/2008 | Morita | 348/333.05 |
| 2008/0199056 A1* | 8/2008 | Tokuse | 382/118 |
| 2008/0239092 A1* | 10/2008 | Sugino et al. | 348/222.1 |
| 2009/0059002 A1* | 3/2009 | Kim | 348/143 |

FOREIGN PATENT DOCUMENTS

| | | |
|---|---|---|
| JP | 11-250223 A | 9/1999 |
| JP | 2004-326555 A | 11/2004 |
| JP | 2007-41927 A | 2/2007 |
| JP | 2008-262416 A | 10/2008 |
| WO | WO 2007/001026 A1 | 1/2007 |

* cited by examiner

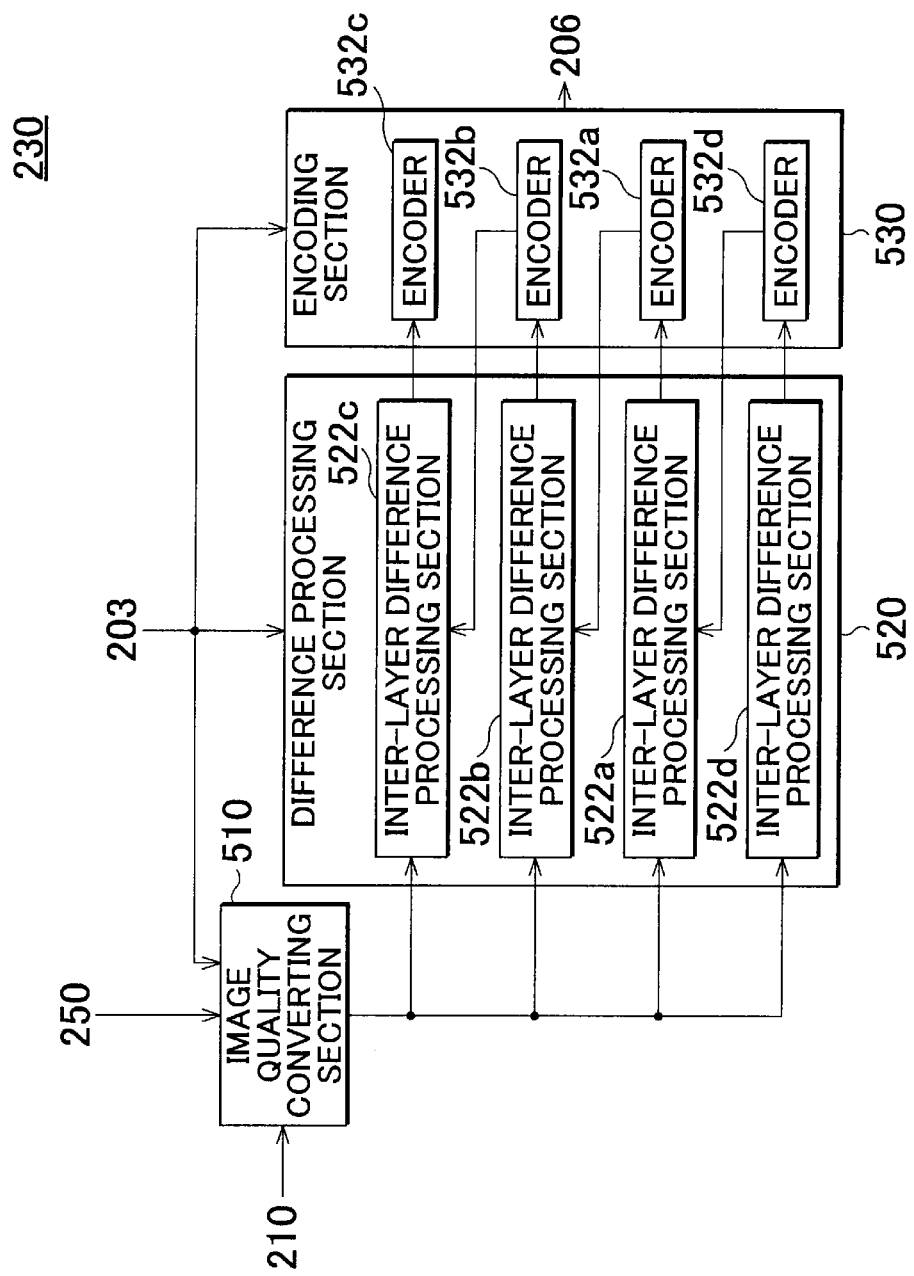
F I G. 5

| TYPE ID | HISTOGRAM | GRADATION CONVERSION | COLOR SET |
|---|---|---|---|
| HEAD | PATTERN - 1 | LUT - 1 | COLOR SET - 1 |
|  | PATTERN - 2 | LUT - 2 | COLOR SET - 1 |
|  | PATTERN - 3 | LUT - 3 | COLOR SET - 1 |
| PERSON | ⋮ | ⋮ | ⋮ |
| MOVING BODY | ⋮ | ⋮ | ⋮ |
| BACKGROUND | ⋮ | ⋮ | ⋮ |

FIG. 9

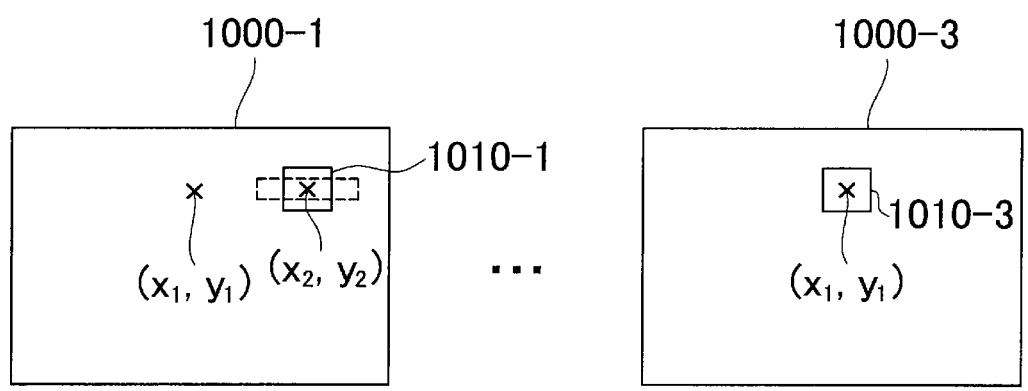
F I G . 10

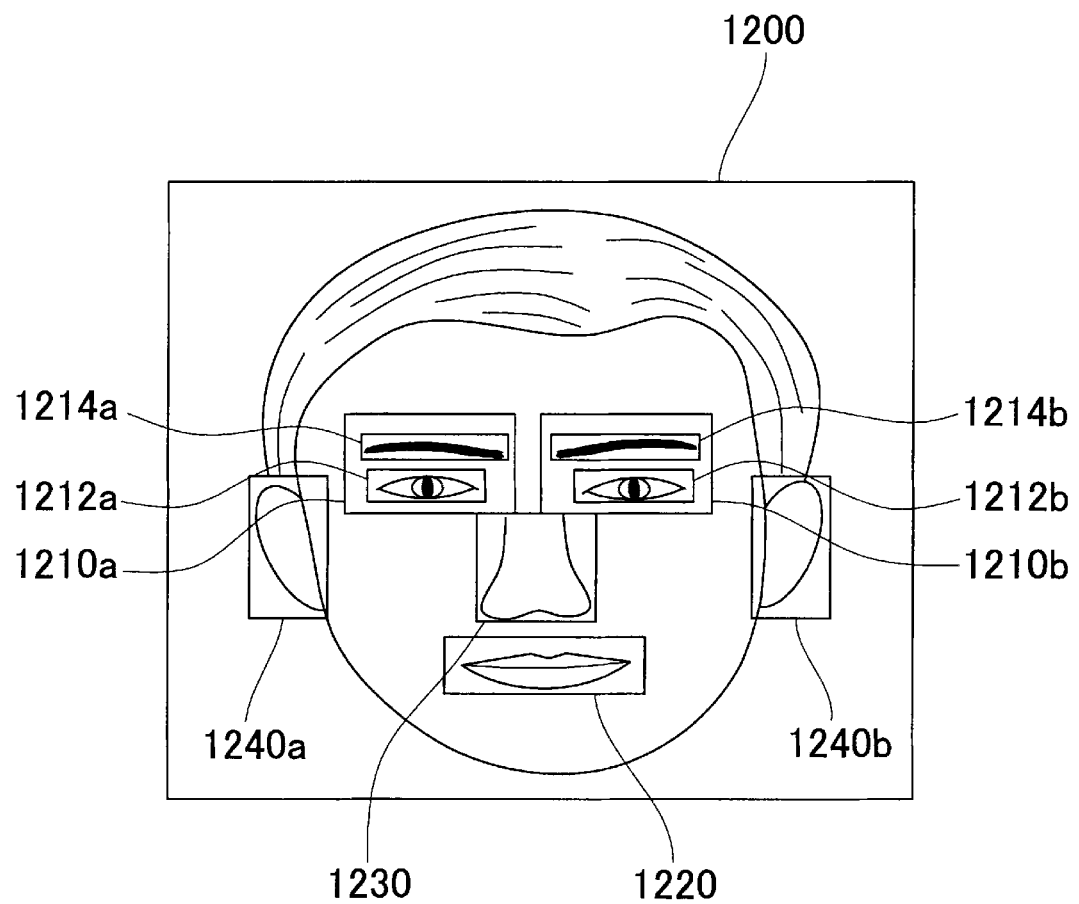
F I G. 12

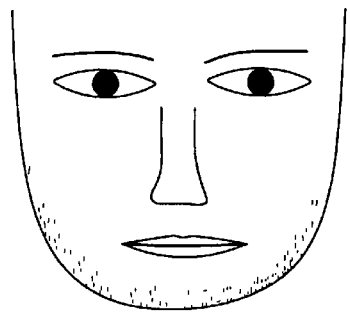
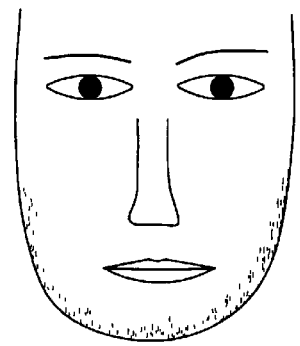
F I G . 17

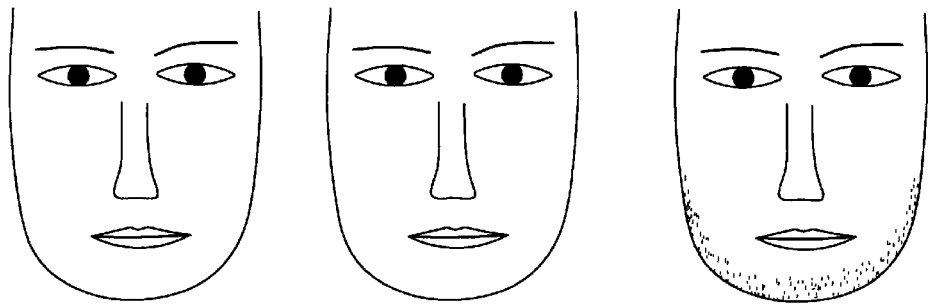
F I G. 18A
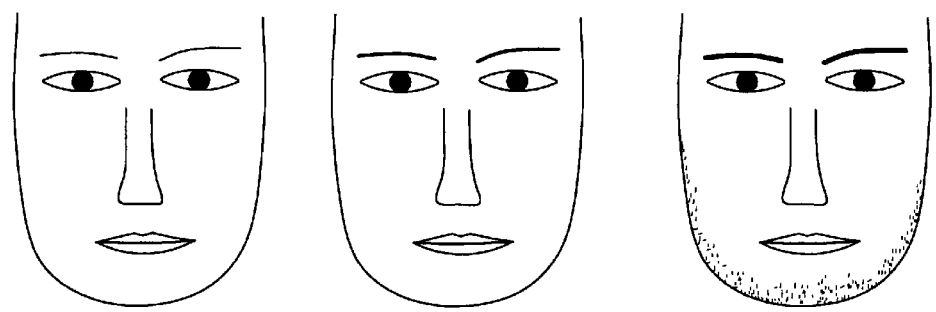
F I G. 18B

| DIRECTION / EXPRESSION | FRONT | RIGHT | LEFT | UPPER | LOWER | BACK |
|---|---|---|---|---|---|---|
| DELIGHT | DELIGHT-FRONT M | DELIGHT-RIGHT M | DELIGHT-LEFT M | DELIGHT-UPPER M | DELIGHT-LOWER M | DELIGHT-BACK M |
| ANGER | ANGER-FRONT M | ANGER-RIGHT M | ANGER-LEFT M | ANGER-UPPER M | ANGER-LOWER M | ANGER-BACK M |
| SORROW | SORROW-FRONT M | SORROW-RIGHT M | SORROW-LEFT M | SORROW-UPPER M | SORROW-LOWER M | SORROW-BACK M |
| PLEASURE | PLEASURE-FRONT M | PLEASURE-RIGHT M | PLEASURE-LEFT M | PLEASURE-UPPER M | PLEASURE-LOWER M | PLEASURE-BACK M |
| SOBER FACE | SOBER FACE-FRONT M | SOBER FACE-RIGHT M | SOBER FACE-LEFT M | SOBER FACE-UPPER M | SOBER FACE-LOWER M | SOBER FACE-BACK M |

FIG. 19

IMAGE PROCESSING SYSTEM

CROSS REFERENCE TO RELATED APPLICATIONS

This application is a Continuation of PCT International Application No. PCT/JP2009/001556 filed on Apr. 2, 2009, which claims priority under 35 U.S.C. 119(a) to Patent Application No. 2008-100541 filed in Japan, on Apr. 4, 2008. The entire contents of all of the above applications is hereby incorporated by reference into the present application.

BACKGROUND

1. Technical Field

The present invention relates to an image processing system.

2. Related Art

An information processing system is known which can capture an image of a predetermined region as well as an image of a moving body in the region, and easily play back an image from the captured images requested by a user (e.g., Patent Document No. 1). Also, a monitor recording apparatus for recording video data of a person entering and exiting a monitor region is known (e.g., Patent Document No. 2). Still more, a tracking video monitoring apparatus which can obtain a high resolution partial image synchronized with the entire image of a low resolution is known (e.g., Patent Document No. 3).

The following shows the specifics of the patent documents cited above.

Patent Document No. 1: Japanese Patent Application Publication No. 2006-245649

Patent Document No. 2: Japanese Patent Application Publication No. 2006-217070

Patent Document No. 3: Japanese Patent Application Publication No. 2006-033793

SUMMARY

However, according to the technologies disclosed in the above-stated patent documents, a partial image such as a best shot image is occasionally displayed overlapped on the video. However if the size of the partial image does not match, simply overlapping the partial image on the video will appear difficult for an observer to recognize.

Therefore, it is an object of an aspect of the innovations herein to provide an image processing system, which is capable of overcoming the above drawbacks accompanying the related art. The above and other objects can be achieved by combinations described in the claims.

According to a first aspect of the innovations herein, provided is an image processing system including: an image obtaining section that obtains a moving image; a characteristic region information obtaining section that obtains information indicating positions of characteristic regions in a plurality of moving image constituting images included in the moving image; and an image generating section that generates display images having substantially the same size as each other, by reducing or enlarging each of images of the characteristic regions included in the plurality of moving image constituting images, based on the positions indicated by the information obtained by the characteristic region information obtaining section.

According to a second aspect of the innovations herein, provided is an image processing method including: obtaining a moving image; obtaining information indicating positions of characteristic regions in a plurality of moving image constituting images included in the moving image; and generating display images having substantially the same size as each other, by reducing or enlarging each of images of the characteristic regions included in the plurality of moving image constituting images, based on the positions indicated by the obtained information.

According to a third aspect of the innovations herein, provided is a computer readable medium storing therein a program for an image processing system, the program causing a computer to function as: an image obtaining section that obtains a moving image; a characteristic region information obtaining section that obtains information indicating positions of characteristic regions in a plurality of moving image constituting images included in the moving image; and an image generating section that generates display images having substantially the same size as each other, by reducing or enlarging each of images of the characteristic regions included in the plurality of moving image constituting images, based on the positions indicated by the information obtained by the characteristic region information obtaining section.

According to a fourth aspect of the innovations herein, provided is an image processing system including: an image obtaining section that obtains a moving image; a characteristic region information obtaining section that obtains information indicating positions of characteristic regions in a plurality of moving image constituting images included in the moving image; and an image generating section that generates display images displaying images of the characteristic regions included in the plurality of moving image constituting images in substantially the same position as each other, based on the positions indicated by the information obtained by the characteristic region information obtaining section.

According to a fifth aspect of the innovations herein, provided is an image processing method including: obtaining a moving image; obtaining information indicating positions of characteristic regions in a plurality of moving image constituting images included in the moving image; and generating display images displaying images of the characteristic regions included in the plurality of moving image constituting images in substantially the same position as each other, based on the positions indicated by the obtained information.

According to a sixth aspect of the innovations herein, provided is a computer readable medium storing therein a program for an image processing system, the program causing a computer to function as: an image obtaining section that obtains a moving image; a characteristic region information obtaining section that obtains information indicating positions of characteristic regions in a plurality of moving image constituting images included in the moving image; and an image generating section that generates display images displaying images of the characteristic regions included in the plurality of moving image constituting images in substantially the same position as each other, based on the positions indicated by the information obtained by the characteristic region information obtaining section.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 5 shows an example of another block configuration of the compression section 230.

FIG. 9 shows an exemplary selecting method adopted by a compression control section 210 for selecting a compression parameter for each region.

FIG. 10 shows an exemplary motion vector search range.

FIG. 12 shows a degree of importance of a partial region in a characteristic region.

FIG. 17 shows an example of an image obtained by converting a sample image into an average facial form.

FIG. 18A and FIG. 18B schematically show an example of change in pixel value when a weighting factor q is changed.

FIG. 19 shows, in a table format, an example of a model stored in a model storage section 350.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
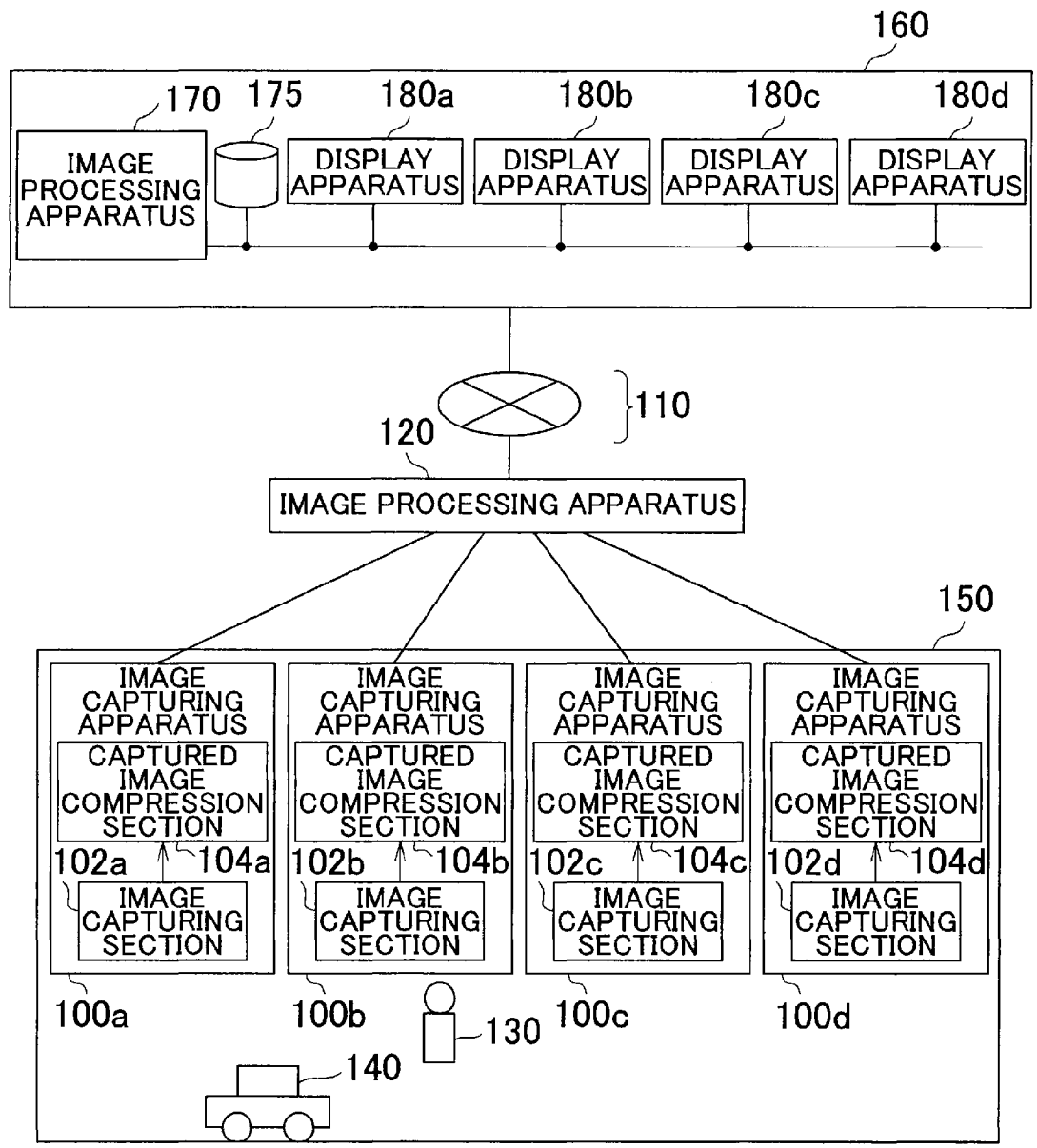
FIG. 1 shows an example of an image processing system 10 according to an embodiment.

FIG. 1 shows an example of an image processing system 10 according to an embodiment. The image processing system 10 can function as a monitoring system as explained below.

The image processing system 10 includes a plurality of image capturing apparatuses 100a-d (hereinafter collectively referred to as "image capturing apparatus 100") for capturing an image of a monitored space 150, an image processing apparatus 120 for processing the images captured by the image capturing apparatus 100, a communication network 110, an image processing apparatus 170, an image DB 175, and a plurality of display apparatuses 180a-d (hereinafter collectively referred to as "display apparatus 180"). The image processing apparatus 170 and the display apparatus 180 are provided in a space 160 different from the monitored space 150.

The image capturing apparatus 100a includes an image capturing section 102a and a captured image compression section 104a. The image capturing section 102a captures a plurality of images by successively capturing the monitored space 150. Note that the images captured by the image capturing section 102a may be images in RAW format. The captured image compression section 104a generates captured moving image data by synchronizing the images in RAW format captured by the image capturing section 102a, and compressing a captured moving image including the plurality of captured images obtained by the synchronization, using MPEG encoding or the like. In this way, the image capturing apparatus 100a generates captured moving image data by encoding the captured moving image obtained by capturing the image of the monitored space 150. The image capturing apparatus 100a outputs the captured moving image data to the image processing apparatus 120.

Since the image capturing apparatuses 100b, 100c, and 100d respectively have the same configuration as that of the image capturing apparatus 100a, the explanation of each constituting element of the image capturing apparatuses 100b, 100c, and 100d is not provided in the following. The image processing apparatus 120 obtains, from each image capturing apparatus 100, the captured moving image data generated by each image capturing apparatus 100.

Then, the image processing apparatus 120 obtains a captured moving image by decoding the captured moving image data obtained from the image capturing apparatus 100. The image processing apparatus 120 detects, from each of a plurality of captured images included in the obtained captured moving image, a plurality of characteristic regions having different characteristic types, such as a region including a person 130, a region including a moving body 140 such as a vehicle, and so on. The image processing apparatus 120 may then compress the images of the characteristic regions at degrees corresponding to the characteristic types, and compress the image of the region other than the characteristic regions, at a degree higher than the compression degrees used in compressing the images of the characteristic regions.

Note that the image processing system 120 converts the image of each characteristic region in a captured image, into an image of the number of colors and/or the number of gradations corresponding to the characteristic type of the characteristic region. When calculating the motion vector in interframe compression, the image processing apparatus 120 may set the motion vector search range to be larger when the difference in position between similar characteristic regions to each other in the plurality of captured images is larger.

Note that the image processing apparatus 120 generates characteristic region information including information identifying a characteristic region detected from a captured image. Then, the image processing apparatus 120 transmits the characteristic region information attached to the compressed moving image data to the image processing apparatus 170 via the communication network 110.

The image processing apparatus 170 receives, from the information processing apparatus 120, the compressed moving image data to which the characteristic region information is attached. The image processing apparatus 170 expands the received compressed moving image data using the attached characteristic region information thereby generating a moving image for display, and supplies the generated moving image for display to the display apparatus 180. During this process, the image processing apparatus 170 may generate the moving image for display across which the image of a characteristic region is displayed in the same size. The display apparatus 180 displays the moving image for display supplied from the image processing apparatus 170.

In addition, the image processing apparatus 170 may record, in the image DB 175, the compressed moving image data, in association with the characteristic region information attached to the compressed moving image data. Note that the image DB 175 may include a nonvolatile recording medium such as a hard disk, to retain the compressed moving image data and the characteristic region information in the recording medium.

The image processing apparatus 170 may read the compressed moving image data and the characteristic region information from the image DB 175, in response to a request from the display apparatus 180, generate a moving image for display by expanding the read compressed moving image data using the characteristic region information, and supply the generated moving image for display, to the display apparatus 180.

Note that the characteristic region information may be text data including the position, the size, and the number of characteristic regions, as well as identification information identifying the captured image from which the characteristic regions are detected. The characteristic region information may also be the above text data provided with processing such as compression and encryption. The image processing apparatus 170 identifies a captured image satisfying various search conditions, based on the position, the size, the number of characteristic regions included in the characteristic region information. The image processing apparatus 170 may decode the identified captured image, and provide the decoded image to the display apparatus 180.

In this way, the image processing system 10 records each characteristic region in association with a moving image, and so can quickly search the moving image for a group of captured images matching a predetermined condition, to perform random access. In addition, the image processing system 10 can decode only a group of captured images matching a predetermined condition, enabling to display a partial moving image matching a predetermined condition quickly in response to a playback request.

Figure 2:
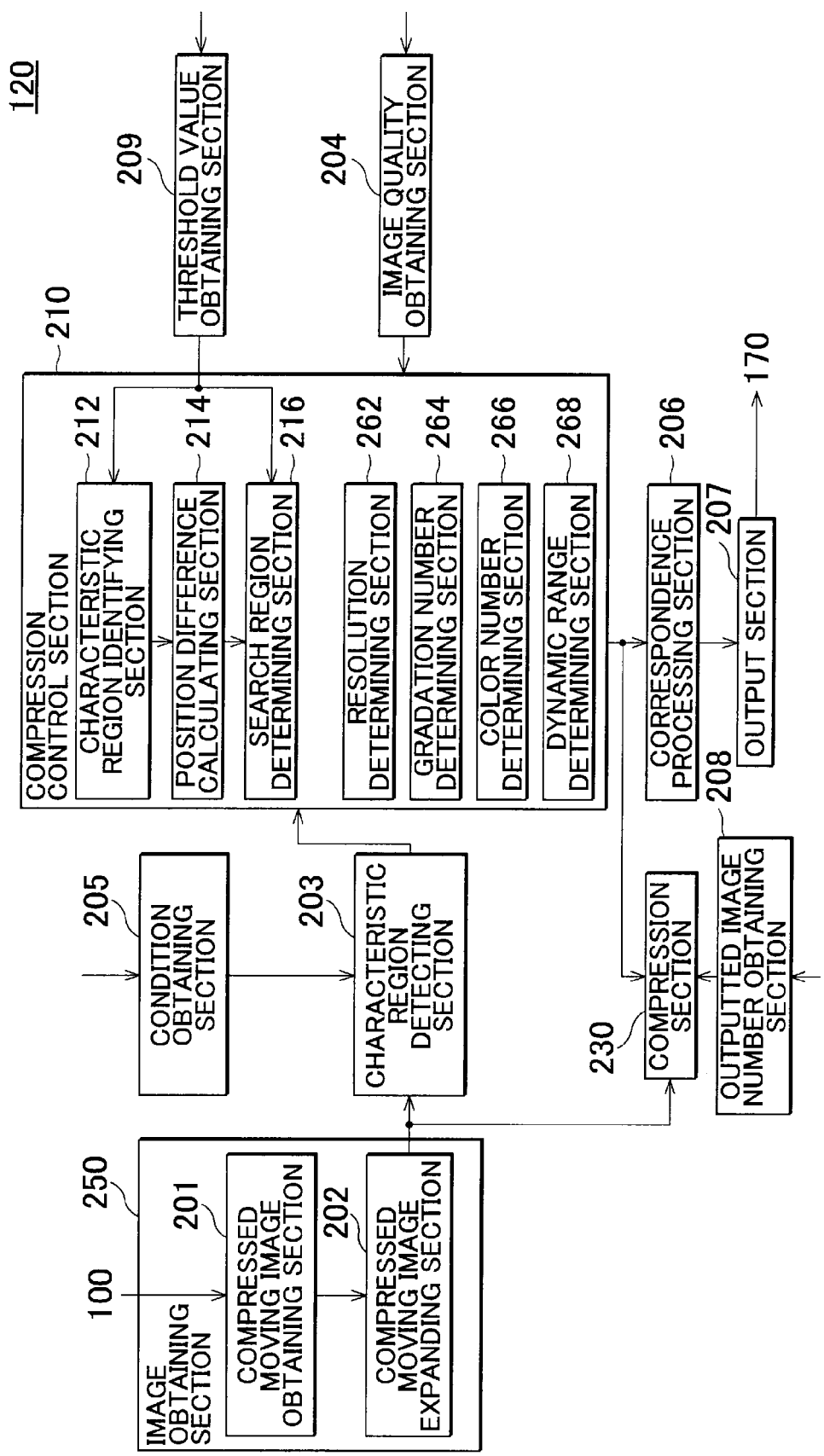
FIG. 2 shows an example of a block configuration of an image processing apparatus 120.

FIG. 2 shows an example of a block configuration of an image processing apparatus 120. The image processing apparatus 120 includes an image obtaining section 250, an image quality obtaining section 204, a condition obtaining section 205, an outputted image number obtaining section 208, a threshold value obtaining section 209, a characteristic region detecting section 203, a compression control section 210, a compression section 230, a correspondence processing section 206, and an output section 207. The image obtaining section 250 includes a compressed moving image obtaining section 201 and a compressed moving image expanding section 202.

The compressed moving image obtaining section 201 obtains the compressed moving image. Specifically, the compressed moving image obtaining section 201 obtains the encoded captured moving image data generated by the image capturing apparatus 100. The compressed moving image expanding section 202 expands the captured moving image data obtained by the compressed moving image obtaining section 201, and generates a plurality of captured images included in the captured moving image. Specifically, the compressed moving image expanding section 202 decodes the encoded captured moving image data obtained by the compressed moving image obtaining section 201, and generates the plurality of captured images included in the captured moving image. A captured image included in the captured moving image may be a frame image or a field image. In this way, the image obtaining section 250 obtains the plurality of moving images captured by each of the plurality of image capturing apparatuses 100.

Note that a captured image in the present embodiment may be an example of a moving image constituting image of the present invention, and the image processing apparatus 120 and the image processing apparatus 170 may process a simple image such as a still image, other than a captured image.

The plurality of captured images obtained by the compressed moving image expanding section 202 are supplied to the characteristic region detecting section 203 and to the compression section 230. The characteristic region detecting section 203 detects a characteristic region from a moving image including a plurality of captured images. Specifically, the characteristic region detecting section 203 detects a characteristic region from each of the plurality of captured images. Note that the above-described captured moving image may be an example of a moving image in the following explanation.

For example, the characteristic region detecting section 203 detects, as a characteristic region, an image region of a moving image, within which the image changes. For example, the characteristic region detecting section 203 detects, as a characteristic region, a region including an object matching a predetermined condition. Specifically, the condition obtaining section 205 obtains a condition which the object included in the characteristic region should match. Then, the characteristic region detecting section 203 detects, as a characteristic region, a region including an object matching the condition obtained by the condition obtaining section 205.

Specifically, the characteristic region detecting section 203 may detect, as a characteristic region, an image region including a moving object. Note that the characteristic region detecting section 203 may detect a plurality of characteristic regions having different characteristic types from each other, from each of the plurality of captured images. Note that the type of a characteristic may be defined using a type of an object (e.g., a person, a moving body) as an index. The type of the object may be determined based on the degree of matching of the form of the objects or the color of the objects. In this way, the characteristic region detecting section 203 may detect, from a plurality of captured images, a plurality of characteristic regions respectively including different types of objects.

Note that the condition obtaining section 205 may obtain the condition indicating a form which the object included in the characteristic region should match. Then, the characteristic region detecting section 203 may detect, as a characteristic region, a region including an object matching the form indicated by the condition obtained by the condition obtaining section 205. Specifically, the characteristic region detecting section 203 may extract an object that matches a predetermined form pattern at a degree of matching higher than a predetermined degree of matching, from each of the plurality of captured images, and detect the regions in the captured images that include the extracted object, as characteristic regions sharing the same characteristic type. A plurality of form patterns may be determined for a plurality of characteristic types respectively. An exemplary form pattern is a form pattern of a face of a person. Note that a plurality of face patterns may be provided for a plurality of people respectively. Accordingly, the characteristic region detecting section 203 may detect different regions including different people from each other, as different characteristic regions. In this way, the characteristic region detecting section 203 may detect, as a characteristic region, a region including an object having a predetermined form. Note that the characteristic region detecting section 203 may also detect, as characteristic regions, regions including a part of a person such as head of a person, hand of a person, or at least a part of a living body other than a human being, not limited to a face of a person mentioned above. Note that a living body includes certain tissue existing inside the living body, such as tumor tissue or blood vessels in the living body. The characteristic region detecting section 203 may also detect, as characteristic regions, regions including money, a card such as a cache card, a vehicle, or a number plate of a vehicle, other than a living body.

In addition to the pattern matching using a template matching, the characteristic region detecting section 203 may also perform characteristic region detection based on the learning result such as by machine learning (e.g. AdaBoost) described in Japanese Patent Application Publication No. 2007-188419. For example, the characteristic region detecting section 203 uses the image feature value extracted from the image of a predetermined subject and the image feature value extracted from the image of a subject other than the predetermined subject, to learn about the characteristic in the image feature value extracted from the image of the predetermined subject. Then, the characteristic region detecting section 203 may detect, as a characteristic region, a region from which the image feature value corresponding to the characteristic matching the learned characteristic is extracted. Accordingly, the characteristic region detecting section 203 can detect, as a characteristic region, a region including a predetermined subject.

As explained above, the characteristic region detecting section 203 detects a plurality of characteristic regions from a plurality of captured images included in each of a plurality of moving images. The characteristic region detecting section 203 supplies information indicating a detected characteristic region to the compression control section 210. Information indicating a characteristic region includes coordinate information of a characteristic region indicating a position of a characteristic region, type information indicating a type of a characteristic region, and information identifying a captured moving image from which a characteristic region is detected.

The compression control section 210 includes a characteristic region identifying section 212, a position difference calculating section 214, a search region determining section 216, a resolution determining section 262, a gradation number determining section 264, a color number determining section 266, and a dynamic range determining section 268. The characteristic region identifying section 212 identifies, from the plurality of captured images included in a moving image, characteristic regions having correlation higher than a predetermined value. The position difference calculating section 214 calculates the difference in position between the characteristic regions having high correlation identified by the characteristic region identifying section 212.

The search region determining section 216 determines a narrower motion vector search region when the difference in position is smaller. Specifically, the search region determining section 216 determines the motion vector search region used to calculate the motion vector for compressing the image included in the characteristic region in the captured image to be narrower when the difference in position is smaller. Note that the operation of the characteristic region identifying section 212, the position difference calculating section 214, and the search region determining section 216 is detailed later.

The compression control section 210 controls compression of a moving image performed by the compression section 230 for each characteristic region, based on the information indicating a characteristic region obtained from the characteristic region detecting section 203. For example, the compression section 230 compresses the captured image by lowering the resolution of the region other than the characteristic regions in the captured image included in the moving image. In this way, the compression section 230 compresses each of image regions in a captured image depending on its degree of importance. Note that the compression control section 210 supplies information indicating the motion vector search region determined by the search region determining section 216, to the compression section 230. The compression section 230 then compresses the moving image using the motion vector calculated by searching the motion vector search region determined by the search region determining section 216. Note that the concrete compression operation performed inside the compression section 230 is detailed later.

The characteristic region identifying section 212 identifies characteristic regions having a degree of matching in image content higher than a predetermined value, to be the characteristic regions having high correlation. For example, the characteristic region identifying section 212 identifies, to be the characteristic regions having high correlation, characteristic regions having a differential value of images of characteristic regions in a plurality of captured images that is smaller than a predetermined value. The threshold value obtaining section 209 may obtain a threshold value regarding the degree of matching in image content of characteristic regions, from outside the image processing apparatus 120. The characteristic region identifying section 212 may then identify, to be the characteristic regions having high correlation, characteristic regions having a degree of matching in image content higher than the threshold value. Alternatively, the characteristic region identifying section 212 may identify, to be the characteristic regions having high correlation, characteristic regions having a degree of matching in size higher than a predetermined value. For example, the threshold value obtaining section 209 obtains a threshold value regarding the degree of matching in size of characteristic regions, from outside the image processing apparatus 120. The characteristic region identifying section 212 then identifies, to be the characteristic regions having high correlation, characteristic regions having a degree of matching in size higher than the threshold value.

Alternatively, the characteristic region identifying section 212 may identify, to be the characteristic regions having high correlation, characteristic regions having correlation regarding the positions in the captured images higher than a predetermined value. Specifically, the characteristic region identifying section 212 may identify, to be the characteristic regions having high correlation, characteristic regions having correlation regarding change in positions in a plurality of captured images higher than a predetermined value. More specifically, the characteristic region identifying section 212 may identify, to be the characteristic regions having high correlation, characteristic regions having correlation regarding moving direction of position across a plurality of captured images higher than a predetermined value. Still alternatively, the characteristic region identifying section 212 may identify, to be the characteristic regions having high correlation, characteristic regions having correlation regarding moving speed of position across a plurality of captured images higher than a predetermined value. Note that the threshold value obtaining section 209 may obtain a threshold value regarding a correlation value regarding the position of characteristic regions, from outside the image processing apparatus 120. The characteristic region identifying section 212 may then identify, to be the characteristic regions having high correlation, characteristic regions having a correlation value higher than the threshold value.

Note that the position difference calculating section 214 calculates the difference in position between characteristic regions having high correlation respectively in a captured image compressed by interframe coding and a captured image on which the predicted image is based. For example, the position difference calculating section 214 calculates the difference in position between characteristic regions having high correlation respectively in a captured image processed as an I frame and a captured image processed as a P frame. The position difference calculating section 214 may also calculate the difference in position between characteristic regions respectively in a captured image processed as an I frame or a P frame and a captured image processed as a P frame, or respectively in a captured image processed as an I frame or a P frame and a captured image processed as a B frame.

When the characteristic region detecting section 203 has detected a plurality of characteristic regions from captured images, the characteristic region identifying section 212 identifies characteristic regions having high correlation among each of the plurality of characteristic regions detected by the characteristic region detecting section 203 from the captured images. Then, the position difference calculating section 214 calculates the difference in position for each of a plurality of characteristic regions detected by the characteristic region detecting section 203 from the captured images. The search region determining section 216 determines a narrower motion vector search range when the maximum value of difference in position calculated for each of the plurality of characteristic regions detected by the characteristic region detecting section 203 from the captured images is smaller. Note that the search region determining section 216 may determine a narrower motion vector search range when the average value of difference in position calculated for each of the plurality of characteristic regions detected by the characteristic region detecting section 203 from the captured images is smaller.

In this way, the search region determining section 216 limits the motion vector search range according to the amount of motion of the characteristic regions. In this way, the compression section 230 can quickly calculate the motion vector, and quickly provide a compressed moving image to the image processing apparatus 170.

Note that the resolution determining section 262 determines the resolution for each of the plurality of characteristic regions according to the respective characteristic type. The gradation number determining section 264 determines the number of gradations of pixel values for each of the plurality of characteristic regions according to the characteristic types of the plurality of characteristic regions. For example, the gradation number determining section 264 determines the number of gradations for the images obtained by the conversion of the later-detailed image converting section 241 for each of the plurality of characteristic regions, based on the frequency distribution of the gradation values in the images of the plurality of characteristic regions.

In addition, the color number determining section 266 determines the number of colors used to express the pixel values in each of the plurality of characteristic regions according to the characteristic types of the plurality of characteristic regions. For example, the color number determining section 266 may determine the number of colors of each of a plurality of characteristic regions in the images obtained by the conversion of the image converting section 241, based on the frequency distribution of the colors in the images of the plurality of characteristic regions.

In addition, the dynamic range determining section 268 determines the dynamic range of the image for each of the plurality of characteristic regions according to the characteristic types of the plurality of characteristic regions. For example, the dynamic range determining section 268 determines the dynamic range for each of the plurality of characteristic regions in the image obtained by conversion of the image converting section 241, based on the frequency distribution of the gradation values in the images of the plurality of characteristic regions. Note that the resolution determining section 262, the gradation number determining section 264, the color number determining section 266, and the dynamic range determining section 268 further determine the resolution, the number of gradations, the number of colors, and the dynamic range in the background region respectively.

Note that the resolution, the number of gradations, the number of colors, and the dynamic range may be designated from outside the image processing apparatus 120. Specifically, the image quality obtaining section 204 obtains at least one of the resolution, the number of gradations, the number of colors, and the dynamic range, in association with the characteristics of the characteristic regions. Then, the resolution determining section 262 may determine the resolution of each of the plurality of characteristic regions, to be the resolution obtained by the image quality obtaining section 204 in association with the characteristic type of the characteristic region. The gradation number determining section 264 may determine the number of gradations of each of the plurality of characteristic regions, to be the number of gradations obtained by the image quality obtaining section 204 in association with the characteristic type of the characteristic region. The color number determining section 266 may determine the number of colors of each of the plurality of characteristic regions, to be the number of colors obtained by the image quality obtaining section 204 in association with the characteristic type of the characteristic region. The dynamic range determining section 268 may determine the dynamic range of each of the plurality of characteristic regions, to be the dynamic range obtained by the image quality obtaining section 204 in association with the characteristic type of the characteristic region.

Information on the resolution determined by the resolution determining section 262, the number of gradations determined by the gradation number determining section 264, the number of colors determined by the color number determining section 266, and the dynamic range determined by the dynamic range determining section 268 is supplied to the compression section 230. The compression section 230 compresses the captured image by converting the image of each region in the captured image into an image having the mentioned resolution, number of gradations, number of colors, and dynamic range.

Note that the outputted image number obtaining section 208 obtains, from outside the image processing apparatus 120, the number of captured images to be outputted in association with the characteristics of the characteristic regions. For example, when the image processing apparatus 120 outputs captured images captured by a part of a plurality of image capturing apparatuses 100, the outputted image number obtaining section 208 obtains the number of image capturing apparatuses 100 to output the captured images through the output section 207, from outside the image processing apparatus 120 in association with the characteristics of the characteristic regions. The number obtained by the outputted image number obtaining section 208 is supplied to the compression section 230. The compression section 230 selects and compresses, for each characteristic region, captured images in number outputted from the outputted image number obtaining section 208 from among the captured images supplied from the image obtaining section 250. In this way, the output section 207 can output inside characteristic region images respectively generated from the plurality of characteristic regions in the captured images and whose number corresponds to the number obtained by the outputted image number obtaining section 208.

The correspondence processing section 206 associates, with a captured image, information identifying a characteristic region detected from the captured image. Specifically, the correspondence processing section 206 associates, with a compressed moving image including a captured image as a moving image constituting image, information identifying a characteristic region detected from the captured image. The output section 207 outputs, to the image processing apparatus 170, the compressed moving image associated by the correspondence processing section 206 with the information identifying the characteristic region.

Then, the output section 207 records, in the image DB 175, the compressed moving image obtained from the image processing apparatus 120. In this way, the output section 207 records, in the image DB 175, information indicating the position of each of a plurality of characteristic regions detected by the characteristic region detecting section 203, in association with information identifying the captured image from which the characteristic region is detected.

Figure 3:
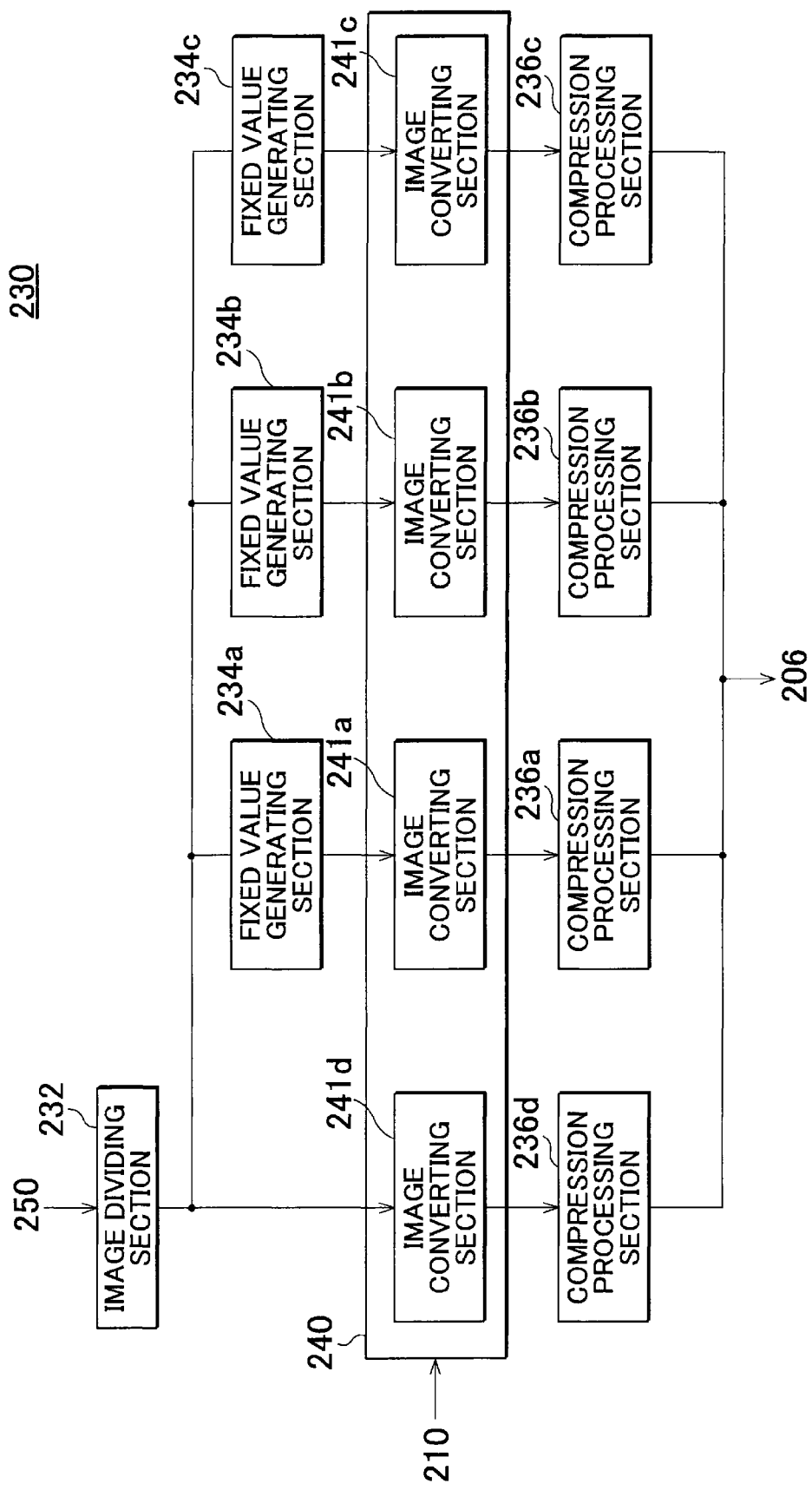
FIG. 3 shows an example of a block configuration of a compression section 230.

FIG. 3 shows an example of a block configuration of a compression section 230. The compression section 230 includes an image dividing section 232, a plurality of fixed value generating sections 234a-c (hereinafter occasionally collectively referred to as "fixed value generating section 234"), an image quality converting unit 240 that includes a plurality of image quality converting sections 241 a-d (hereinafter collectively referred to as "image quality converting section 241"), and a plurality of compression processing sections 236a-d (hereinafter occasionally collectively referred to as "compression processing section 236").

The image dividing section 232 obtains a plurality of captured images from the image obtaining section 250. Then, the image dividing section 232 divides characteristic regions from a background region other than the characteristic regions, in the plurality of captured images. Specifically, the image dividing section 232 divides each of a plurality of characteristic regions from a background region other than the characteristic regions, in the plurality of captured images. In this way, the image dividing section 232 divides characteristic regions from a background region in each of the plurality of captured images.

The image converting section 241 converts a characteristic region in a captured image and a region other than the characteristic region in the captured image, respectively into different number of gradations. Specifically, the image converting section 241 converts the image of the region other than the characteristic region in the captured image, into the number of gradations smaller than the number of gradations of the characteristic region.

More specifically, the image converting section 241 converts the images of the plurality of characteristic regions in the captured images, into the numbers of gradations predetermined according to the characteristics of the characteristic regions. The image converting section 241 converts the images of the plurality of characteristic regions in the captured images, into predetermined numbers of gradations according to the characteristic types of the characteristic regions. Note that the image converting section 241 converts the images of the plurality of characteristic regions in the captured images, into predetermined numbers of gradations according to the types of the objects included in the characteristic regions. In this way, the characteristic types in the present embodiment may be the types of the objects included in the characteristic regions.

Note that the number of gradations in each image region is determined by the gradation number determining section 264 as described above. The image converting section 241 then converts the images of the plurality of characteristic regions in the captured image, into images respectively having the number of gradations determined by the gradation number determining section 264.

In addition, the image converting section 241 converts a captured image so that the characteristic region in the captured image has a different number of colors from the number of colors of the region other than the characteristic region in the captured image. Specifically, the image converting section 241 converts the image of the region other than the characteristic region in the captured image, into the number of colors smaller than the number of colors of the characteristic region. Note that the image converting section 241 may convert the image of the region other than the characteristic region in the captured image into an image represented by colors generated by a smaller number of color components than the color components of the image of the characteristic region.

In addition, the image converting section 241 may convert the images of the plurality of characteristic regions in the captured images, into the number of colors predetermined according to the characteristics of the characteristic regions. The image converting section 241 may convert the images of the plurality of characteristic regions in the captured images, into the combination of colors predetermined according to the characteristic types of the characteristic regions. Specifically, the image converting section 241 may convert the images of the plurality of characteristic regions in the captured images, into a color generated by the number of color components predetermined according to the characteristic types of the characteristic regions.

Note that the number of colors in each image region is determined by the color number determining section 266 as described above. The image converting section 241 then converts the images of the plurality of characteristic regions in the captured image, into images respectively having the number of colors determined by the color number determining section 266.

The image converting section 241 converts a characteristic region in a captured image and a region other than the characteristic region in the captured image, respectively into different dynamic ranges. Note that the image converting section 241 converts the image of the region other than the characteristic region in the captured image, into a dynamic range wider than the dynamic range of the characteristic region. Specifically, the image converting section 241 converts the images of the plurality of characteristic regions in the captured images, into dynamic ranges predetermined according to the characteristics of the characteristic regions. The image converting section 241 converts the images of the plurality of characteristic regions in the captured images, into dynamic ranges predetermined according to the characteristic types of the characteristic regions.

Note that the dynamic range in each image region is determined by the dynamic range determining section 268 as described above. The image converting section 241 then converts the images of the plurality of characteristic regions in the captured images, into images respectively having the dynamic ranges determined by the dynamic range determining section 268. Note that the image converting section 241 may convert the images of the characteristic region and the background region into respective images of combinations of the above-mentioned number of gradations, number of colors, and dynamic range.

The compression processing section 236 compresses a characteristic region image that is an image of a characteristic region and a background region image that is an image of a background region at different degrees from each other. Specifically, the compression processing section 236 compresses a characteristic region moving image including a plurality of characteristic region images, and a background region moving image including a plurality of background region images at different degrees from each other.

Specifically, the image dividing section 232 divides a plurality of captured images to generate a characteristic region moving image for each of a plurality of characteristic types. The fixed value generating section 234 generates, for each characteristic region image included in a plurality of characteristic region moving images respectively generated according to characteristic types, a fixed value of a pixel value of a region other than the characteristic region corresponding to the characteristic. Specifically, the fixed value generating section 234 sets the pixel value of the region other than the characteristic regions to be a predetermined pixel value. Then, the compression processing section 236 compresses the plurality of characteristic region moving images for each characteristic type. For example, the compression processing section 236 MPEG compresses the plurality of characteristic region moving images for each characteristic type.

Note that the fixed value generating sections 234a, 234b, and 234c respectively perform the fixed value processing on the characteristic region moving image of the first characteristic type, the characteristic region moving image of the second characteristic type, and the characteristic region moving image of the third characteristic type. Then, the compression processing sections 236a, 236b, and 236c compress the characteristic region moving image of the first characteristic type, the characteristic region moving image of the second characteristic type, and the characteristic region moving image of the third characteristic type.

Note that the compression processing sections 236a-c compress a characteristic region moving image at a predetermined degree according to a characteristic type. For example, the compression processing section 236 may convert characteristic region moving images into respectively different resolutions predetermined according to characteristic types, and compress the converted characteristic region moving images. When compressing the characteristic region moving images using MPEG encoding, the compression processing section 236 may compress the characteristic region moving images with respectively different quantization parameters predetermined according to characteristic types.

Note that the compression processing sections 236a-c may insert, to the top of an encoded data sequence obtained by encoding a macroblock including a characteristic region, a code indicating that decoding starting from the data sequence is possible. An exemplary code is a resynchronization marker (RM). Note that the compression processing sections 236a-c may insert the code to the top of each of the plurality of encoded data sequences obtained by encoding all the macroblocks including the characteristic regions. Note that the compression processing sections 236a-c may insert the code only to the top of the plurality of successive encoded data sequences obtained by encoding the macroblocks including the characteristic regions. Note that the compression processing sections 236a-c also insert the code to the top of an encoded data sequence obtained by encoding an AC component of a macroblock including a characteristic region, in addition to the encoded data sequence obtained by encoding the DC component of the macroblock.

Note that the compression processing section 236d compresses the background region moving image. Note that the compression processing section 236d may compress a background region moving image at a degree higher than any degree adopted by the compression processing sections 236a-c. The characteristic region moving images and the background region moving image compressed by the compression processing section 236 are supplied to the correspondence processing section 206.

In this way, the captured image obtained by the conversion performed by the image converting section 241 is outputted through the output section 207. Specifically, information identifying the plurality of characteristic regions detected by the characteristic region detecting section 203 is outputted in association with the captured images obtained by the conversion performed by the image converting section 241. Specifically, information identifying the plurality of characteristic regions detected by the characteristic region detecting section 203 as well as information identifying the characteristics of the plurality of characteristic regions are outputted from the output section 207 in association with the images obtained by the conversion performed by the image converting section 241.

Since the region other than the characteristic region has been subjected to the fixed value processing by the fixed value generating section 234, when the compression processing section 236 performs prediction coding such as MPEG encoding, the amount of difference between the image and the predicted image in the region other than the characteristic region can be substantially reduced. Therefore, the compression ratio of the characteristic region moving image can be substantially enhanced.

Note that the compression section 230 uses different compression methods for characteristic regions respectively having different areas. For example, the compression section 230 uses a compression method for one or more characteristic regions detected from a single captured image, according to the summation of the areas of the one or more characteristic regions. More specifically, the compression section 230 uses a first compression method when the summation of the areas is equal to or smaller than a predetermined threshold value, and uses a second compression method when the summation of the areas is equal to or greater than the predetermined threshold value. For example, the compression section 230 compresses the characteristic region and the region other than the characteristic region, at different degrees from each other, on condition that the summation of areas is equal to or smaller than the threshold value, as described above. The following explains the operation performed using the second compression method when the summation of areas is equal to or greater than the threshold value.

When the summation of areas is equal to or greater than the threshold value, the compression processing section 236c that compresses a captured image at the highest image quality from among the compression processing sections 236 is adopted to compress the entire image region. Specifically, the fixed value generating section 234c supplies the supplied captured image to the image converting section 241c as it is without performing the fixed value processing. Then, the image converting section 241c converts the captured image into an image quality having been preset. Note that when the summation of areas is equal to or greater than the threshold value, the image converting section 241c does not have to perform image conversion on the captured image. Then, the compression processing section 236c compresses the captured image supplied from the image converting section 241c. Note that the compression processing section 236c compresses a plurality of captured images as a moving image as described above.

In this way, when the summation of areas is equal to or greater than the threshold value, the compression section 230 executes the same compression performed as when the entire region of the captured image is assumed to be detected as a characteristic region. According to the operation in the first compression method, the image of the characteristic region is encoded both in the compression procession section 236d and one of the compression processing sections 236a-c. Therefore, when the summation of areas has become extremely large and if the first compression method is adopted, the above-mentioned overlapped encoded amount may occasionally surpass the reduction of the encoded amount resulting from rendering the background region in low image quality.

So as to cope with this problem, the threshold at which such a situation causes is predetermined, and when the summation of areas has become equal to or greater than the threshold value, the compression processing section 236c is used to compress the entire image region, so as to prevent the encoded amount from becoming larger. Note that when the summation of areas has become equal to or greater than the threshold value, the characteristic region detecting section 203 may decrease the temporal frequency of detecting characteristic regions. For example, the characteristic region detecting section 203 may detect a characteristic region from a part of the plurality of captured images having been successively captured. During this operation, the characteristic region detection section 203 may detect a characteristic region from a smaller number of captured images when the summation of areas is larger. Accordingly, the time required in detecting a characteristic region can be reduced.

Note that the compression processing sections 236a, 236b, and 236d may also compress the captured image even when the summation of areas has become equal to or greater than the threshold value. In this case, the output section 207 does not have to transmit compression data resulting from compression by the compression processing sections 236a, 236b, and 236d, at least to the image processing apparatus 170. Alternatively, the compression processing sections 236a, 236b, and 236d may be provided with the captured image whose entire surface has a fixed value, and output the compressed data to be transmitted. As explained above, the compression section 230 may change the compression processing method according to the summation of areas, thereby occasionally enabling to easily prevent the increase in amount of data transmitted by the image processing apparatus 170.

Note that in this drawing, each of the plurality of compression processing sections 236 included in the compression section 230 compresses the images of the plurality of characteristic regions and the image of the background region. However, in another embodiment, the compression section 230 may include a single compression processing section 236, and this single compression processing section 236 may compress the images of the plurality of characteristic regions and the image of the background region at respectively different degrees. For example, an arrangement is possible in which the images of the plurality of characteristic regions and the image of the background region are sequentially supplied in time division to the single compression processing section 236, and the single compression processing section 236 sequentially compresses the images of the plurality of characteristic regions and the image of the background region at respectively different degrees.

Alternatively, a single compression processing section 236 may compress the images of the plurality of characteristic regions and the image of the background region at different degrees from each other, by respectively quantizing the image information of the plurality of characteristic regions and the image information of the background region at different quantization factors from each other. An arrangement is also possible in which the images resulting from converting the images of the plurality of characteristic regions and the image of the background region are converted into respectively different image qualities are supplied to the single compression processing section 236, and the single compression processing section 236 compresses the images of the plurality of characteristic regions and the image of the background region respectively. Note that this image quality conversion may be performed by a single image quality converting unit 240. Also in such an embodiment described above in which a single compression processing section 236 performs quantization using different quantization factors for each of regions and the images converted into different image qualities for each of regions are converted by a single compression processing section 236, the single compression processing section 236 may compress a single image, or may compress the images divided by the image dividing section 232 respectively as in the present drawing. Note that when a single compression processing section 236 compresses a single image, the dividing processing by the image dividing section 232 and the fixed value processing by the fixed value generating section 234 are unnecessary, and so the compression section 230 does not have to include any image dividing section 232 or fixed value generating section 234.

Figure 4:
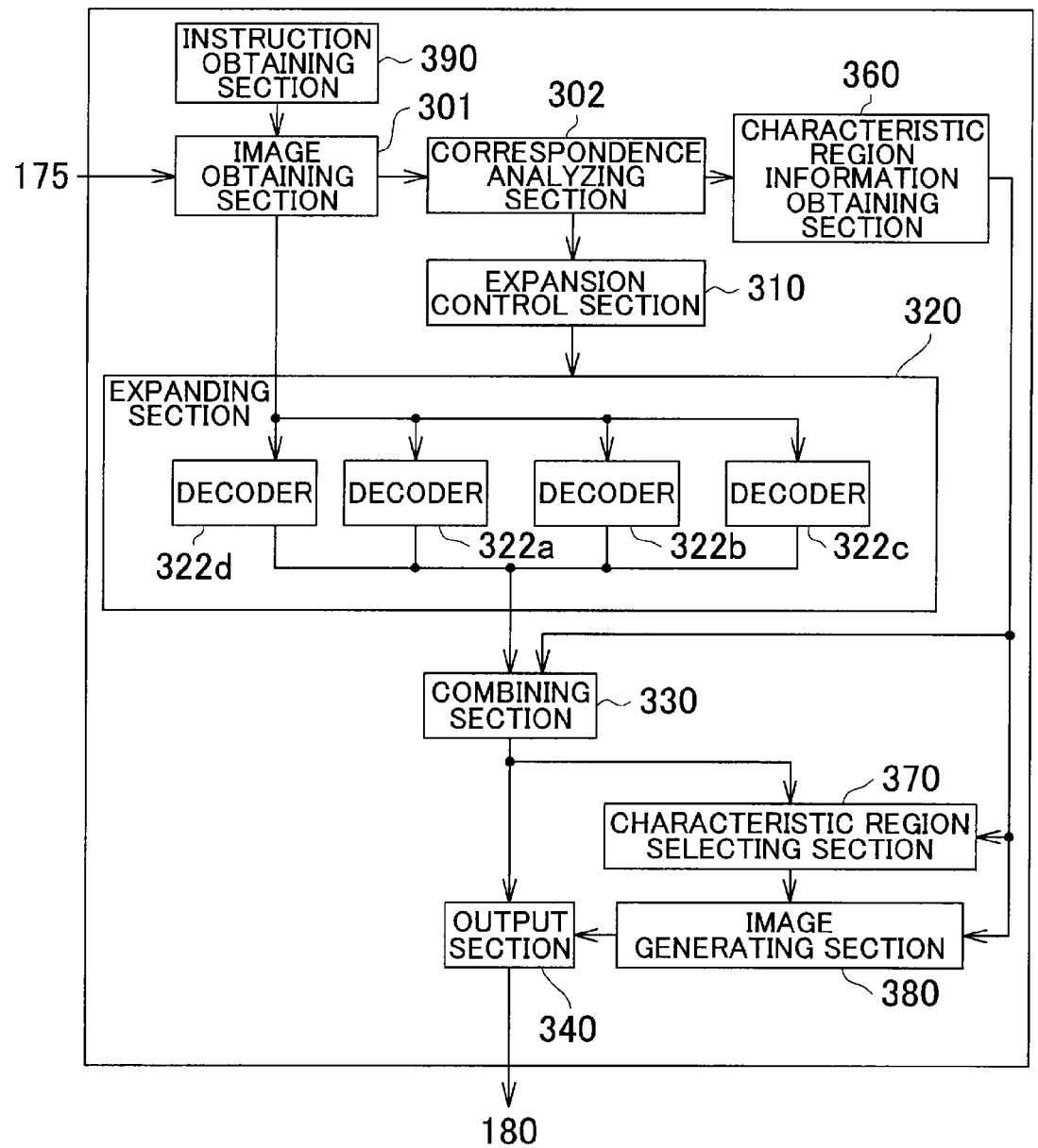
FIG. 4 shows an example of a block configuration of an image processing apparatus 170.
Figure 6A:
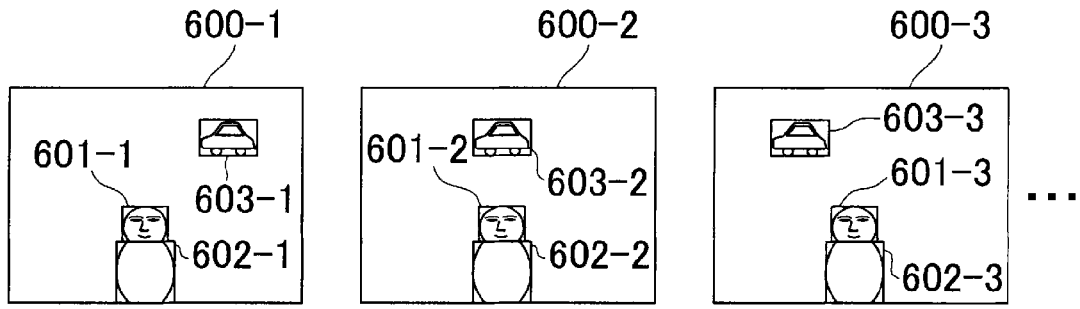
FIGS. 6A-6D show an exemplary captured moving image obtained by an image capturing apparatus 100.
Figure 6B:
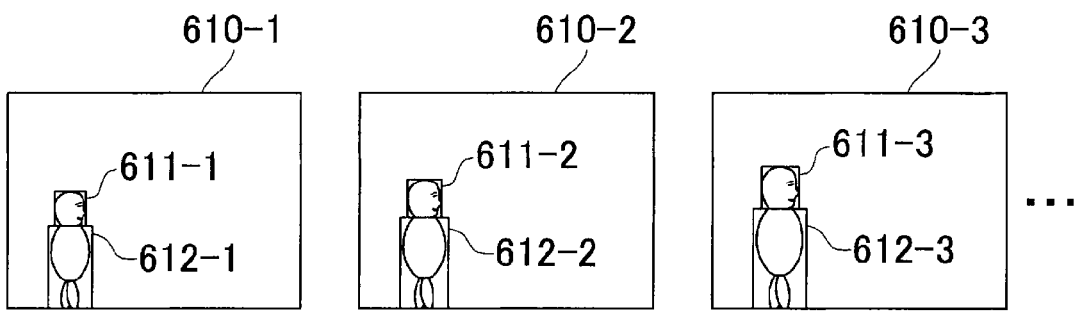
Figure 6C:
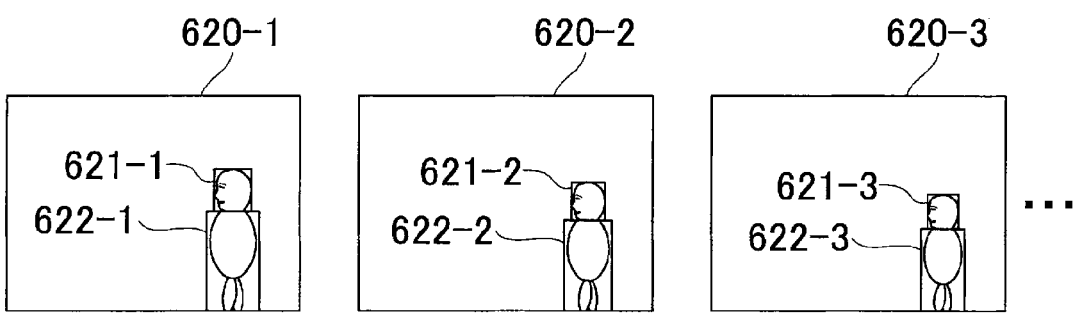
Figure 6D:
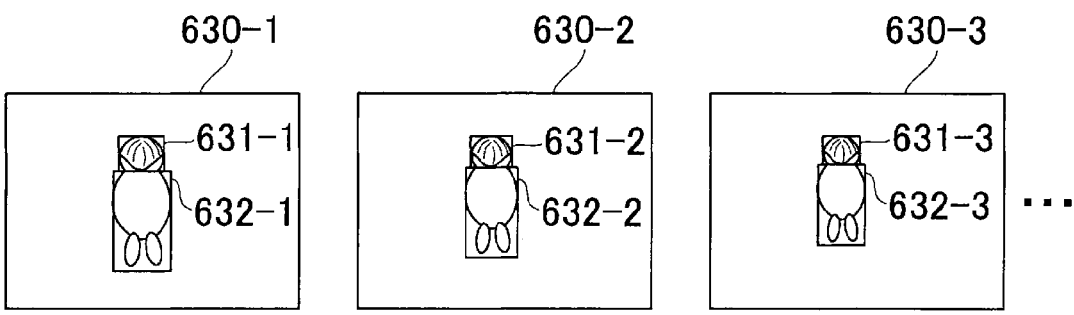

FIG. 4 shows an example of a block configuration of an image processing apparatus 170. The image processing apparatus 170 includes an image obtaining section 301, a correspondence analyzing section 302, a characteristic region information obtaining section 360, an expansion control section 310, an expanding section 320, a combining section 330, an instruction obtaining section 390, a characteristic region selecting section 370, an image generating section 380, and an output section 340.

The image obtaining section 301 obtains a compressed moving image compressed by the compression section 230. Specifically, the image obtaining section 301 obtains a compressed moving image including a plurality of characteristic region moving images and a background region moving image that includes a first captured image and a second captured image as moving image constituting images. More specifically, the image obtaining section 301 obtains a compressed moving image to which characteristic region information is attached.

The correspondence analyzing section 302 separates the compressed moving image obtained from the image DB 175, into a plurality of characteristic region moving images and a background region moving image, and characteristic region information, and supplies the plurality of characteristic region moving images and the background region moving image to the expanding section 320. In addition, the correspondence analyzing section 302 analyzes the characteristic region information, and supplies the positions of the characteristic regions and the characteristic types to the expansion control section 310 and the characteristic region information obtaining section 360.

In this way, the characteristic region information obtaining section 360 can obtain the information indicating the position of each characteristic region in each of a plurality of captured images included in a moving image. The characteristic region information obtained by the characteristic region information obtaining section 360 is supplied to the combining section 330, the characteristic region selecting section 370, and the image generating section 380.

The expansion control section 310 controls the expanding processing by the expanding section 320, according to the position of the characteristic region and the characteristic type obtained from the correspondence analyzing section 302. For example, the expansion control section 310 controls the expanding section 320 to expand each region of a moving image represented by the compressed moving image, according to a compression method adopted by the compression section 230 in compressing each region of the moving image according to the position of the characteristic region and the characteristic type.

The following explains the operation of each constituting element of the expanding section 320. The expanding section 320 includes a plurality of decoders 322a-d (hereinafter collectively referred to as "decoder 322"). The decoder 322 decodes one of the plurality of characteristic region moving images and the background region moving image, which have been encoded. Specifically, the decoders 322a, 322b, 322c, and 322d respectively decode the first, second, third characteristic region moving images and a background region moving image.

The combining section 330 generates a single moving image for display, by combining the plurality of characteristic region moving images and the background region moving image expanded by the expanding section 320. Specifically, the combining section 330 generates a single moving image for display by combining, on the captured images included in the background region moving image, the image of the characteristic region on the captured images included in the plurality of characteristic region moving images. The combining section 330 supplies the generated moving image for display to the output section 340. The output section 340 outputs, to the display apparatus 180, the moving image for display and the characteristic region information obtained from the correspondence analyzing section 302.

Note that from among the plurality of captured images included in the moving image generated by the combining section 330, the image within the characteristic region is supplied to the characteristic region selecting section 370. The characteristic region selecting section 370 selects, from among the plurality of characteristic regions, those matching the predetermined condition. Concretely, the characteristic region selecting section 370 selects, from among the plurality of characteristic regions having different characteristic types, those having a predetermined type of characteristics. More concretely, the characteristic region selecting section 370 selects, from among the plurality of characteristic regions including different objects from each other, those including a predetermined object.

Then, the image generating section 380 generates each display image by reducing or enlarging each of the images of the plurality of characteristic regions selected by the characteristic region selecting section 370. In this way, the image generating section 380 generates each display image having substantially the same size, by reducing or enlarging each of the images of the characteristic regions respectively included in the plurality of captured images, based on the position indicated by the information obtained by the characteristic region information obtaining section 360.

The display image generated by the image generating section 380 is supplied to the output section 340. Note that the output section 340 may cause the display apparatus 180 to display the display image by overlapping or combining it on the moving image for display generated by the combining section 330.

In this way, in such cases as when a certain type of characteristic regions have been detected or when characteristic regions including a certain object have been detected, the image generating section 380 can generate a display image in which the images of the characteristic regions can be displayed in the same size as each other. Therefore, the images of the characteristic regions can always be displayed in the same size as each other. Therefore, the image processing system 10 can provide a monitor image that can be easily monitored by an observer.

Note that the characteristic region selecting section 370 may select, from among the plurality of characteristic regions, those detected from the moving image over a period of time longer than a predetermined time length. In this case, the image of the object appearing in the moving image for a long period of time can be provided. In addition, the characteristic region selecting section 370 may select, from among the plurality of characteristic regions, those having correlation higher than a predetermined value.

Note that the above-explained operation of the image processing apparatus 170 may be performed when the instruction obtaining section 390 has obtained an instruction to display a display image. That is, when the instruction obtaining section 390 has obtained such an instruction, the image generating section 380 can generate each display image having substantially the same size as one another, by reducing or enlarging each of the images of the characteristic regions respectively included in the plurality of captured images, based on the positions of the plurality of characteristic regions indicated by the information recorded in the image DB 175 in association with the moving image.

Note that when the instruction obtaining section 390 has obtained such an instruction, the expanding section 320 identifies the plurality of captured images identified by the information recorded in association with the information indicating the positions of the plurality of characteristic regions respectively. Then, the expanding section 320 expands a partial moving image corresponding to a period including a display timing at which the plurality of captured images in the compressed moving image which are identified by the recorded information are displayed. In this way, when the instruction obtaining section 390 has obtained such an instruction, the expanding section 320 expands a specific partial moving image in the moving image, Then, when the instruction obtaining section 390 has obtained such an instruction, the image generating section 380 generates each display image by reducing or enlarging each of the images of the plurality of characteristic regions in the plurality of captured images included in the partial moving image expanded by the expanding section, based on the positions of the plurality of characteristic regions indicated by the information recorded in association with the compressed moving image. Therefore, the image processing apparatus 170 can quickly supply the display image to the display apparatus 180.

FIG. 5 shows an example of another block configuration of the compression section 230. The compression section 230 in the present configuration compresses a plurality of captured images by means of coding processing that is spatio scalable according to the characteristic type.

The compression section 230 in the present configuration includes an image quality converting section 510, a difference processing section 520, and an encoding section 530. The difference processing section 520 includes a plurality of inter-layer difference processing sections 522a-d (hereinafter collectively referred to as "inter-layer difference processing section 522"). The encoding section 530 includes a plurality of encoders 532a-d (hereinafter collectively referred to as "encoder 532").

The image quality converting section 510 obtains a plurality of captured images from the image obtaining section 250. In addition, the image quality converting section 510 obtains information identifying the characteristic region detected by the characteristic region detecting section 203 and information identifying the characteristic type of the characteristic region. The image quality converting section 510 then generates the captured images in number corresponding to the number of characteristic types of the characteristic regions, by copying the captured images. The image quality converting section 510 converts the generated captured images into images of resolution according to the respective characteristic types.

For example, the image quality converting section 510 generates a captured image converted into resolution according to a background region (hereinafter referred to as "low resolution image"), a captured image converted into first resolution according to a first characteristic type (hereinafter referred to as "first resolution image"), a captured image converted into second resolution according to a second characteristic type (hereinafter referred to as "second resolution image"), and a captured image converted into third resolution according to a third characteristic type (hereinafter referred to as "third resolution image"). Here, the first resolution image has a higher resolution than the resolution of the low resolution image, and the second resolution image has a higher resolution than the resolution of the first resolution image, and the third resolution image has a higher resolution than the resolution of the second resolution image.

The image quality converting section 510 supplies the low resolution image, the first resolution image, the second resolution image, and the third resolution image, respectively to the inter-layer difference processing section 522d, the inter-layer difference processing section 522a, the inter-layer difference processing section 522b, and the inter-layer difference processing section 522c. Note that the image quality converting section 510 supplies a moving image to each of the inter-layer difference processing sections 522 as a result of performing the image quality converting processing to each of the plurality of captured images.

Note that the image quality converting section 510 may convert the frame rate of the moving image supplied to each of the inter-layer difference processing sections 522 according to the characteristic type of the characteristic region. For example, the image quality converting section 510 may supply, to the inter-layer difference processing section 522d, the moving image having a frame rate lower than the frame rate of the moving image supplied to the inter-layer difference processing section 522a. In addition, the image quality converting section 510 may supply, to the inter-layer difference processing section 522a, the moving image having a frame rate lower than the frame rate of the moving image supplied to the inter-layer difference processing section 522b, and may supply, to the inter-layer difference processing section 522b, the moving image having a frame rate lower than the frame rate of the moving image supplied to the inter-layer difference processing section 522c. Note that the image quality converting section 510 may convert the frame rate of the moving image supplied to the inter-layer difference processing section 522, by thinning the captured images according to the characteristic type of the characteristic region.

The inter-layer difference processing section 522d and the encoder 532d perform prediction coding on the background region moving image including a plurality of low resolution images. Specifically, the inter-layer difference processing section 522 generates a differential image representing a difference from the predicted image generated from the other low resolution images. Then, the encoder 532d quantizes the conversion factor obtained by converting the differential image into spatial frequency component, and encodes the quantized conversion factor using entropy coding or the like. Note that such prediction coding processing may be performed for each partial region of a low resolution image.

In addition, the inter-layer difference processing section 522a performs prediction coding on the first characteristic region moving image including a plurality of first resolution images supplied from the image quality converting section 510. Likewise, the inter-layer difference processing section 522b and the inter-layer difference processing section 522c respectively perform prediction coding on the second characteristic region moving image including a plurality of second resolution images and on the third characteristic region moving image including a plurality of third resolution images. The following explains the concrete operation performed by the inter-layer difference processing section 522a and the encoder 532a.

The inter-layer difference processing section 522a decodes the first resolution image having been encoded by the encoder 532d, and enlarges the decoded image to an image having a same resolution as the first resolution. Then, the inter-layer difference processing section 522a generates a differential image representing a difference between the enlarged image and the low resolution image. During this operation, the inter-layer difference processing section 522a sets the differential value in the background region to be 0. Then, the encoder 532a encodes the differential image just as the encoder 532d has done. Note that the encoding processing may be performed by the inter-layer difference processing section 522a and the encoder 532a for each partial region of the first resolution image.

When encoding the first resolution image, the inter-layer difference processing section 522a compares the amount of encoding predicted to result by encoding the differential image representing the difference from the low resolution image and the amount of encoding predicted to result by encoding the differential image representing the difference from the predicted image generated from the other first resolution image. When the latter amount of encoding is smaller than the former, the inter-layer difference processing section 522a generates the differential image representing the difference from the predicted image generated from the other first resolution image. When the encoding amount of the first resolution image is predicted to be smaller as it is without taking any difference with the low resolution image or with the predicted image, the inter-layer difference processing section 522a does not have to calculate the difference from the low resolution image or the predicted image.

Note that the inter-layer difference processing section 522a does not have to set the differential value in the background region to be 0. In this case, the encoder 532a may set the data after encoding with respect to the information on difference in the region other than the characteristic region (hereinafter occasionally referred to as "non-characteristic region") to be 0. For example, the encoder 532a may set the conversion factor after converting to the frequency component to be 0. When the inter-layer difference processing section 522d has performed prediction coding, the motion vector information is supplied to the inter-layer difference processing section 522a. The inter-layer difference processing section 522a may calculate the motion vector for a predicted image, using the motion vector information supplied from the inter-layer difference processing section 522d.

Note that the operation performed by the inter-layer difference processing section 522b and the encoder 532b is substantially the same as the operation performed by the inter-layer difference processing section 522a and the encoder 532a, except that the second resolution image is encoded, and when the second resolution image is encoded, the difference from the first resolution image after encoding by the encoder 532a may be occasionally calculated, and so is not explained below. Likewise, the operation performed by the inter-layer difference processing section 522c and the encoder 532c is substantially the same as the operation performed by the inter-layer difference processing section 522a and the encoder 532a, except that the third resolution image is encoded, and when the third resolution image is encoded, the difference from the second resolution image after encoding by the encoder 532b may be occasionally calculated, and so is not explained below.

As explained above, the image quality converting section 510 generates, from each of the plurality of captured images, a low image quality image and a characteristic region image having a higher image quality than the low image quality image at least in the characteristic region. The difference processing section 520 generates a characteristic region differential image being a differential image representing a difference between the image of the characteristic region in the characteristic region image and the image of the characteristic region in the low image quality image. Then, the encoding section 530 encodes the characteristic region differential image and the low image quality image respectively.

The image quality converting section 510 also generates low image quality images resulting from lowering the resolution of the plurality of captured images, and the difference processing section 520 generates a characteristic region differential image representing a difference between the image of the characteristic region in the characteristic region image and the image resulting from enlarging the image of the characteristic region in the low image quality image. In addition, the difference processing section 520 generates a characteristic region differential image having a characteristic region and a non-characteristic region, where the characteristic region has a spatial frequency component corresponding to a difference between the characteristic region image and the enlarged image converted into a spatial frequency region, and an amount of data for the spatial frequency component is reduced in the non-characteristic region.

As explained above, the compression section 230 can perform hierarchical encoding by encoding the difference between the plurality of inter-layer images having different resolutions from each other. As can be understood, a part of the compression method adopted by the compression section 230 in the present configuration includes the compression method according to H.264/SVC. Note that to expand such a hierarchically compressed moving image, the image processing apparatus 170 can generate a captured image having an original resolution by decoding the moving image data of each layer and adding the decoded captured image in the layer for which the difference was taken in the region for which encoding was performed using the inter-layer difference.

FIGS. 6A-6D show an exemplary captured moving image obtained by an image capturing apparatus 100. A captured moving image A captured by an image capturing apparatus 100a includes a plurality of captured images 600-1 through 600-3 (hereinafter collectively referred to as "captured image 600"). In addition, a captured moving image B captured by an image capturing apparatus 100b includes a plurality of captured images 6104 through 610-3 (hereinafter collectively referred to as "captured images 610"), and a captured moving image C captured by an image capturing apparatus 100c includes a plurality of captured images 620-1 through 620-3 (hereinafter collectively referred to as "captured images 620"), and a captured moving image D captured by an image capturing apparatus 100d includes a plurality of captured images 630-1 through 630-3 (hereinafter collectively referred to as "captured images 630").

The image capturing regions respective of the image capturing apparatuses 100a, 100b, 100c, and 100d are assumed to overlap at least partially. Then, the image capturing apparatuses 100a, 100b, 100c, and 100d are also assumed to capture the respective image capturing regions overlapping each other, from respectively different directions.

Note that the characteristic region detecting section 203 has detected, as an exemplary characteristic region, head regions 601-1 through 601-3 (hereinafter collectively referred to as "head region 601"), body regions 602-1 through 602-3 (hereinafter collectively referred to as "body region 602"), and moving body regions 603-1 through 603-3 (hereinafter collectively referred to as "moving body region 603"), from the captured image 600. In addition, the characteristic region detecting section 203 has detected, as an exemplary characteristic region, head regions 611-1 through 611-3 (hereinafter collectively referred to as "head region 611"), and body regions 612-1 through 612-3 (hereinafter collectively referred to as "body region 612"), from the captured image 610. In addition, the characteristic region detecting section 203 has detected, as an exemplary characteristic region, head regions 621-1 through 621-3 (hereinafter collectively referred to as "head region 621"), and body regions 622-1 through 622-3 (hereinafter collectively referred to as "body region 622"), from the captured image 620. In addition, the characteristic region detecting section 203 has detected, as an exemplary characteristic region, head regions 631-1 through 631-3 (hereinafter collectively referred to as "head region 631"), and body regions 632-1 through 632-3 (hereinafter collectively referred to as "body region 632"), from the captured image 630.

In this way, when the image obtaining section 301 has detected a plurality of captured images captured by the plurality of image capturing apparatuses 100 provided in different positions from each other, the output section 207 may determine the number of images to be outputted for each region. For example, the output section 207 may output images of characteristic regions in number predetermined for each type of characteristic regions. Specifically, the output section 207 determines to output, for the head region, the images of the head region (images of the head regions 601-1, 611-1, 621-1, and 631-1) generated by all of the four captured images obtained by image capturing performed by all of the four image capturing apparatuses 100 (e.g., captured images 600-1, 610-1, 620-1, and 630-1).

In addition, the output section 207 determines to output, for the body region, the images of the body region (images of the body regions 602-1, 612-1, and 622-1) generated by the three captured images captured by the different three image capturing apparatuses 100 (e.g., captured images 600-1, 610-1, and 620-1). In addition, the output section 207 determines to output, for the moving body region, the two images of the moving body region captured by the two image capturing apparatuses 100, and to output, for the background region, a single captured image captured by a single image capturing apparatus 100.

Since a moving body region is detected only from the captured image 600-1, of all the captured images 600-1, 610-

1, 620-1, and 630-1, the output section 207 determines to output the image of the moving body region 603 in the captured image 600-1. For the background region, the output section 207 determines to output the image of the background region in the captured image 600-1.

Note that the output section 207 may select from among the captured images 600, based on the priorities assigned to the image capturing apparatuses 100 in advance. For example, the output section 207 may select, with higher priority, captured images 600 captured by an image capturing apparatus 100 assigned higher priority. Then, the output section 207 outputs the images in determined number, from among the images of the characteristic regions and the image of the background region included in the selected captured image 600.

In this way, the output section 207 outputs the first number of inside characteristic region images, which are images of the subject captured inside the characteristic regions respectively generated from the first number of captured images, and the second number of outside characteristic region images, which are images of the subject captured outside the characteristic regions respectively generated by the second number of captured images, where the second number is different from the first number. Then, the output section 207 outputs the first number of inside characteristic region images respectively generated from the first number of captured images, where the first number is greater than the second number. In addition, when a plurality of characteristic regions are detected, the output section 207 outputs a predetermined number of inside characteristic region images according to the characteristics of the plurality of characteristic regions, from among the plurality of inside characteristic region images generated from the respective characteristic regions in the captured images.

In this way, the image processing apparatus 10 may provide images in which a subject in a characteristic region is captured in directions more in number than the number of directions in which a subject in a background region is captured. Therefore, the subject in the characteristic region can be later analyzed with higher accuracy. In addition, the image processing system 10 does not have to transmit the image of the background region in the captured image captured by a part of the image capturing apparatuses 100, which substantially reduces the amount of transmission data.

Figure 7:
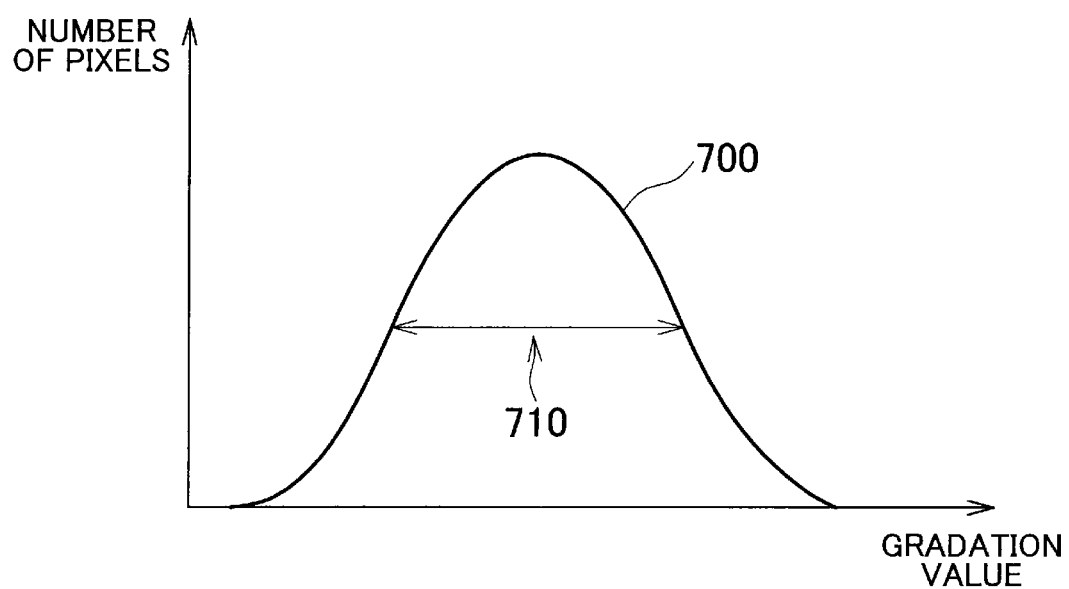
FIG. 7 shows an exemplary histogram 700 of a gradation value in a characteristic region or in a background region.

FIG. 7 shows an exemplary histogram 700 of a gradation value in a characteristic region or in a background region. The characteristic length 710 represents the spread of the histogram 700. An exemplary characteristic length 710 is a half width.

The gradation number determining section 264 determines the number of gradations predetermined according to the characteristic type of the characteristic region. The gradation number determining section 264 determines the predetermined number of gradations for the background region to be smaller than the predetermined number of gradations for the characteristic regions. The gradation number determining section 264 determines the smaller number of gradations when the length of the characteristic length 710 is shorter. For example, the gradation number determining section 264 may determine, as the number of gradations of the image of the characteristic region, the value obtained by subtracting the number that is inversely proportional to the characteristic length 710 from the predetermined number of gradations according to the characteristic type of the characteristic region.

Accordingly, the compression section 230 converts the image of an image region in a smaller number of gradations, when the spread of the distribution of the histogram 700 in the image region is smaller. This enhances the compression ratio.

Figure 8:
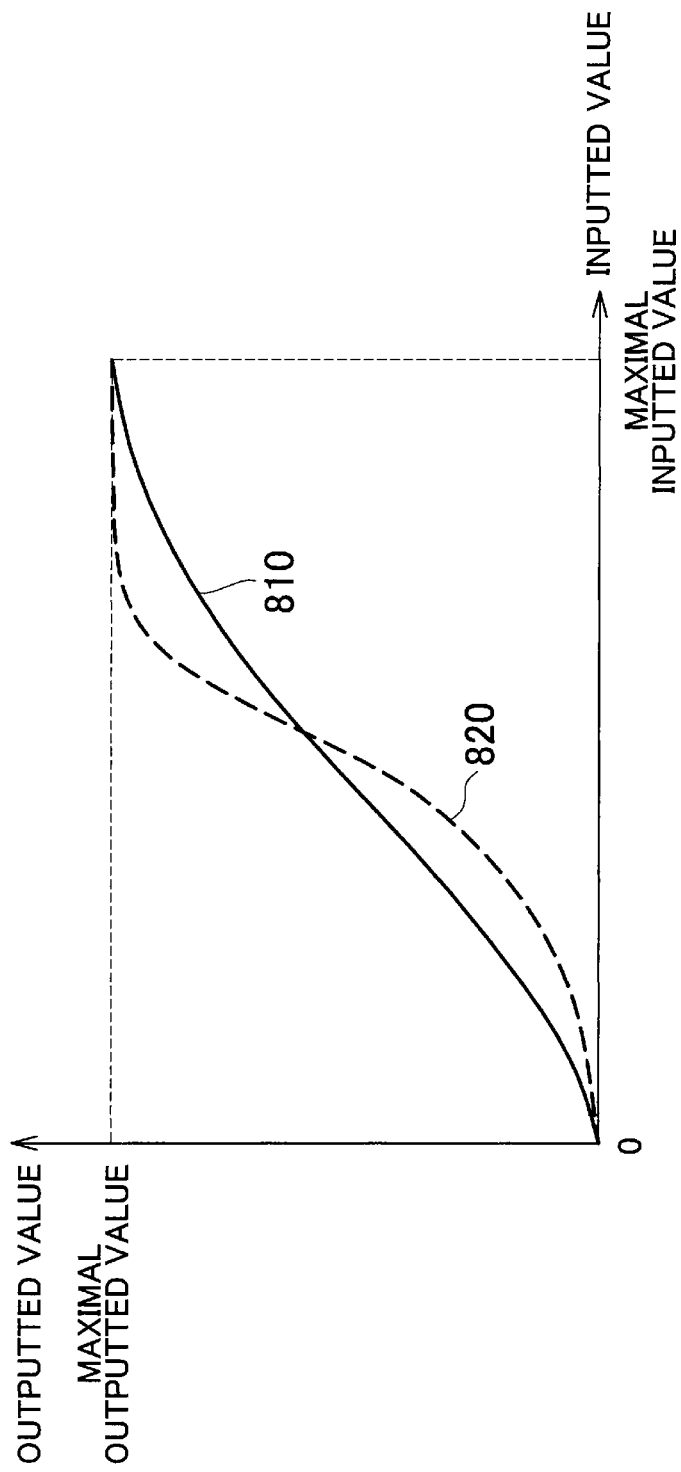
FIG. 8 shows an exemplary conversion curve for gradation conversion.

FIG. 8 shows an exemplary conversion curve for gradation conversion. The dynamic range determining section 268 stores in advance a plurality of conversion curves (e.g., conversion curves 810, 820, etc.) for converting an inputted pixel value. The dynamic range determining section 268 selects a single conversion curve for each region, from among the plurality of conversion curves stored in advance. Note that the dynamic range determining section 268 may select a conversion curve representing a wider dynamic range for a characteristic region, and may select a conversion curve representing a narrower dynamic range, for a background region.

FIG. 9 shows an exemplary selecting method adopted by a compression control section 210 for selecting a compression parameter for each region. The compression control section 210 stores a type ID which identifies a type of the region, information identifying a pattern of a histogram, information identifying a gradation conversion method, and information identifying a color set, in association with each other. The type ID identifies whether it is a characteristic region or a background region, and also identifies the characteristic type of the characteristic region. The information identifying a pattern of a histogram may indicate a distribution of a histogram explained above with reference to FIG. 7. Exemplary information identifying a histogram is the characteristic length 710.

The information identifying a gradation conversion method may identify LUT. The LUT may realize conversion that utilizes the conversion curve explained with reference to FIG. 8. The information identifying a color set may be a color set representing a combination of colors usable as a pixel value.

The dynamic range determining section 268 specifies the information identifying the LUT stored in association with the type ID matching the region and the information identifying the pattern matching and the pattern of the histogram in the region. The dynamic range determining section 268 supplies the LUT information identified by the information, to the compression section 230. In this way, the dynamic range determining section 268 determines the dynamic range for each region.

In addition, the color number determining section 266 identifies the color set stored in association with the type ID matching the region and the information identifying the pattern matching the pattern of the histogram in the region. The color number determining section 266 supplies the color set identified by the information, to the compression section 230. In this way, the color number determining section 266 determines the number of colors used for each region.

Note that the color set stored in association with a characteristic region may be formed by colors represented by the three or more primary colors (e.g., five primary colors or seven primary colors), and the color set stored in association with a background region may be formed by three primary colors (e.g., RGB). The color set stored in association with a characteristic region includes a color having a color difference component, and the color set stored in association with a background region may not include a color having a color difference component. Note that the color conversion, the dynamic range conversion, the resolution conversion, and the gradation number conversion are performed by the image converting section 241 or by the image quality converting section 510.

FIG. 10 shows an exemplary motion vector search range. The characteristic region detecting section 203 detects characteristic regions 1010-1 and 1010-3 (hereinafter collectively referred to as "characteristic regions 1010") respectively from the captured images 1000-1 and 1000-3 (hereinafter collectively referred to as "captured image 1000"). In addition, the characteristic regions 1010-1 and 1010-3 are identified by the characteristic region identifying section 212 to be characteristic regions having high correlation.

In this case, the position difference calculating section 214 calculates the difference in position between the characteristic regions 1010-1 and 1010-3. Note that when the barycenter of the characteristic region 1010-3 corresponds to (x1, y1), and the barycenter of the characteristic region 1010-1 corresponds to (x2, y2), the difference in position is assumed to be (x2-x1, y2-y1). The search region determining section 216 determines the region 1020 including (x2, y2) as a motion vector search range.

During this process, the search region determining section 216 may determine a smaller region 1020 when the magnitude of the difference in position is smaller. The motion vector search range determined by the search region determining section 216 is supplied to the compression section 230. When performing interframe compression on the characteristic region 1010-3, the compression section 230 may calculate the motion vector by performing motion prediction within the motion vector search range determined by the search region determining section 216.

In this way, the search region determining section 216 determines the motion vector search region for calculating the motion vector used in compressing the image included in the characteristic region in the captured image 1000-3 to be compressed by interframe prediction, in the vicinity of a position in the captured image 1000-1 which corresponds to the characteristic region having high correlation with the characteristic region in the captured image 1000-3, the captured image 1000-1 serving as a basis of a predicted image in the interframe prediction. As a result, the compression section 230 can perform motion prediction in the narrowed range, to be able to reduce the amount of operation incurred in the motion vector calculation. This enables high speed calculation of the motion vector, to improve the compression speed. In addition, the compression section 230 can calculate the motion vector with high accuracy. Note that the search region determining section 216 may determine, in the direction in which the characteristic region moves which is represented by the difference in position of the characteristic regions, a wider motion vector search region than the width in the direction vertical to this direction.

Figure 11:
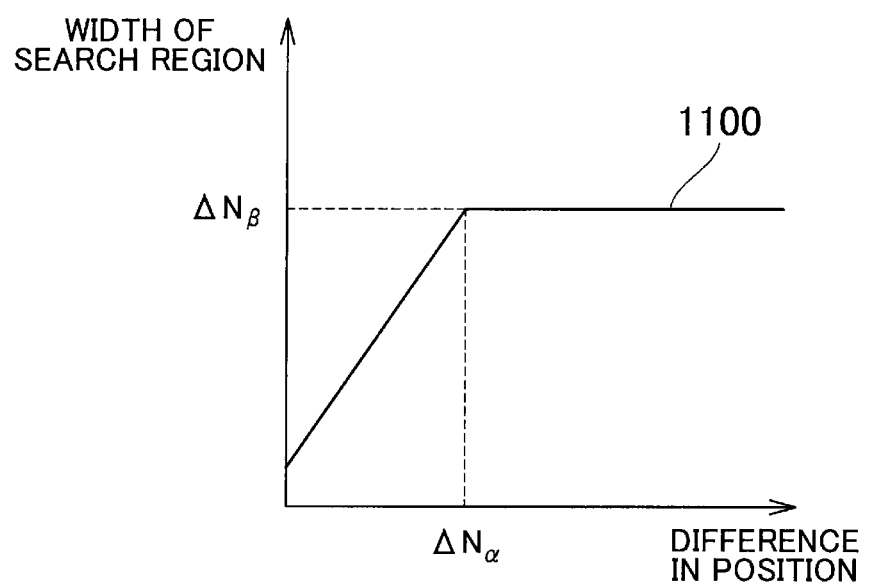
FIG. 11 shows exemplary dependency of the width of the search region with respect to the magnitude of difference in position.

FIG. 11 shows exemplary dependency of the width of the search region with respect to the magnitude of difference in position. Note that the position difference calculating section 214 calculates the difference in position expressed in the unit of a pixel in each of x-direction and y-direction.

As indicated by the line 1100 representing the dependency, the search region determining section 216 monotonically increases the width of the motion vector search range as long as the difference in position calculated by the position difference calculating section 214 stays within the predetermined value of $\Delta N\alpha$. When the difference in position calculated by the position difference calculating section 214 is equal to or greater than $\Delta N\alpha$, the search region determining section 216 sets the upper limit value of the width of the motion vector search region to be $\Delta N\beta$. In this way, when the magnitude of the difference in position is greater than a predetermined value, the search region determining section 216 determines the motion vector search region to have a predetermined width. Note that the threshold value obtaining section 209 obtains, from outside the image processing apparatus 120, the threshold value of the difference in position. When the magnitude of the difference in position is greater than the threshold value, the search region determining section 216 determines the motion vector search region to have a predetermined width. As explained above, since an upper limit is set to the width of the motion vector search region, the motion vector search range is prevented from becoming unnecessarily large.

FIG. 12 shows a degree of importance of a partial region in a characteristic region. The characteristic region detecting section 203 detects a plurality of regions having different degrees of importance within the head region 1200 which is an example of a characteristic region. For example, the characteristic region detecting section 203 detects, within the head region 1200, eye regions 1210a and 1210b (hereinafter collectively referred to as "eye region 1210"), a mouth region 1220, a nose region 1230, and ear regions 1240a and 1240b (hereinafter collectively referred to as "ear region 1240").

Note that the degree of importance is set to become large in the order of the eye region 1210, the nose region 1230, the mouth region 1220, and the ear region 1240. Information indicating the position of each region in the head region 1200 detected by the characteristic region detecting section 203 is supplied to the compression section 230. The compression section 230 compresses the image of each region in the head region 1200 at a degree corresponding to the respective degree of importance.

Specifically, the compression section 230 controls the strength of the spatial frequency filter and/or the quantization factor so that the encoding amount becomes the targeted encoding amount determined according to the degree of importance of each region, for the image of each region in the head region 1200. Note that the degree of importance may be predetermined based on the accuracy rate of person recognition. In this way, the compression section 230 compresses each region hierarchically detected from the head region 1200, which respectively has a different importance degree, depending on the degree of importance. Accordingly, the image processing apparatus 170 can detect and recognize a person with higher accuracy even from the compressed captured image.

The characteristic region detecting section 203 further detects a plurality of regions having different degrees of importance also in the eye region 1210. For example, the characteristic region detecting section 203 detects, in the eye region 1210, eye regions 1212a and 1212b (hereinafter collectively referred to as "eye region 1212"), and eyebrow regions 1214a and 1214b (hereinafter collectively referred to as "eyebrow regions 1214"). Note that the eye region 1212 may be set to have a higher degree of importance than the eyebrow region 1214. The compression section 230 may then compress the image of each region in the eye region 1210 at a degree corresponding to the degree of importance, just as the compression directed to each region in the head region 1200.

Figure 13:
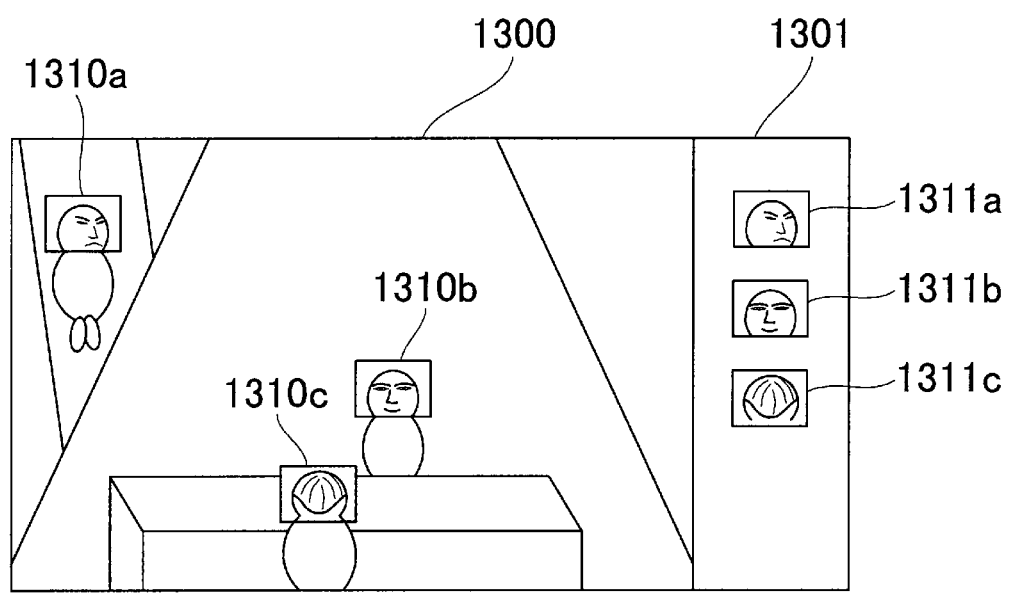
FIG. 13 shows an exemplary display of a display apparatus 180.

FIG. 13 shows an exemplary display of a display apparatus 180. The display area of the display apparatus 180 includes a moving image area 1300 and a targeted image area 1301. The image processing apparatus 170 provides the display apparatus 180 with moving image data which corresponds to the moving image obtained by the combining section 330 and displayed in the moving image area 1300. In addition, the image processing apparatus 170 provides the display apparatus 180 with the moving image data which corresponds to the display image(s) generated by the image generating section 380 and displayed in the targeted image area 1301.

Specifically, the image generating section 380 generates head images 1311a through 1311c (hereinafter collectively referred to as "head image 1311"), which are images of the head regions 1310a through 1310c (hereinafter collectively referred to as "head region 1310") of the people included in the moving image displayed in the moving image area 1300. Note that the head region 1310 may be an exemplary characteristic region, and the head image 1311 may be an example of the display image.

Here, the image generating section 380 generates the head image 1311 by enlarging or reducing the image of the head region 1310 to have the same size as each other. Accordingly, the head image 1311, being displayed to have the same size as each other, can be easily to be monitored by an observer.

In addition, the image generating section 380 generates the head image 1311 displayed in a different position from the image of the head region 1310. Note that the image generating section 380 may generate the head images 1311 displayed not to overlap with each other. In this way, the image generating section 380 generates display images that simultaneously display images of a plurality of characteristic regions in respectively different positions having been predetermined.

Note that the image generating section 380 may generate a moving image including a plurality of head images 1311. For example, the image generating section 380 may generate a plurality of head images 1311 from the image of the head region 1310 in each of the plurality of captured images included in the moving image. Here, the characteristic region selecting section 370 selects a plurality of head regions 1310 having higher correlation than a predetermined value with respect to the images of the lower region of the head region 1310, from among the plurality of head images 1310 in the plurality of captured images.

For example, the characteristic region selecting section 370 extracts texture information of clothing from the image of the lower region of the head region 1310 in each of the plurality of captured images. The characteristic region selecting section 370 may select, to be head regions 1310 having high correlation, the plurality of head regions 1310 positioned above the lower regions whose extracted texture information matches each other at a degree of matching greater than a predetermined value. Alternatively, the characteristic region selecting section 370 may select, to be head regions 1310 having high correlation, the plurality of head regions 1310 positioned above the lower regions whose combination of colors thereof match each other at a degree of matching greater than a predetermined value.

Then, the image generating section 380 may generate a moving image in which the plurality of head images 1311a are successively displayed in the same position. In this way, the image generating section 380 may generate display images displaying, in substantially the same position, the images of the characteristic regions respectively included in the plurality of captured images, based on the position indicated by the information obtained by the characteristic region information obtaining section 360. Here, the image generating section 380 may generate display images displaying, in substantially the same position, the images of the characteristic regions including the same subject.

Note that in the example of this drawing, each head image 1311 is drawn to have the same size as each other; however the size of each head image 1311 generated by the image generating section 380 may be predetermined according to the position of the corresponding head region 1310. For example, the image generating section 380 may generate a larger head image 1311 from the image of a head region 1310 positioned at a more important position. In the example of this drawing, the image generating section 380 may generate a larger head image 1311 than the other head image 1311, from the head region (e.g., head region 1310b) distanced from the counter by a distance shorter than a predetermined distance. In this way, the image processing system 10 can perform emphasized display of the image of a person positioned in an important region.

In this way, the image generating section 380 may generate display images having sizes respectively corresponding to the positions of the plurality of characteristic regions, by reducing or enlarging each of the images of the plurality of characteristic regions. Note that the image generating section 380 may generate display images having sizes respectively corresponding to the positions of the subject in a real space represented by the positions of the plurality of characteristic regions, by reducing or enlarging each of the images of the plurality of characteristic regions. In addition, the image generating section 380 may also generate display images having sizes respectively corresponding to the sizes of the subject in a real space represented by the sizes of the plurality of characteristic regions, by reducing or enlarging each of the images of the plurality of characteristic regions.

Note that the image generating section 380 may generate display images that simultaneously display the images of the plurality of characteristic regions in predetermined positions respectively corresponding to display timings in the moving image. For example, the image generating section 380 may generate head images 1311 to be displayed in a predetermined direction in the display order of them. Note that the position at which the image of a characteristic region is displayed may be determined depending on at least one of the size of the characteristic region, the size of the specific subject included in the characteristic region, or the image of the lower region (e.g., clothing region) of the head.

Figure 14:
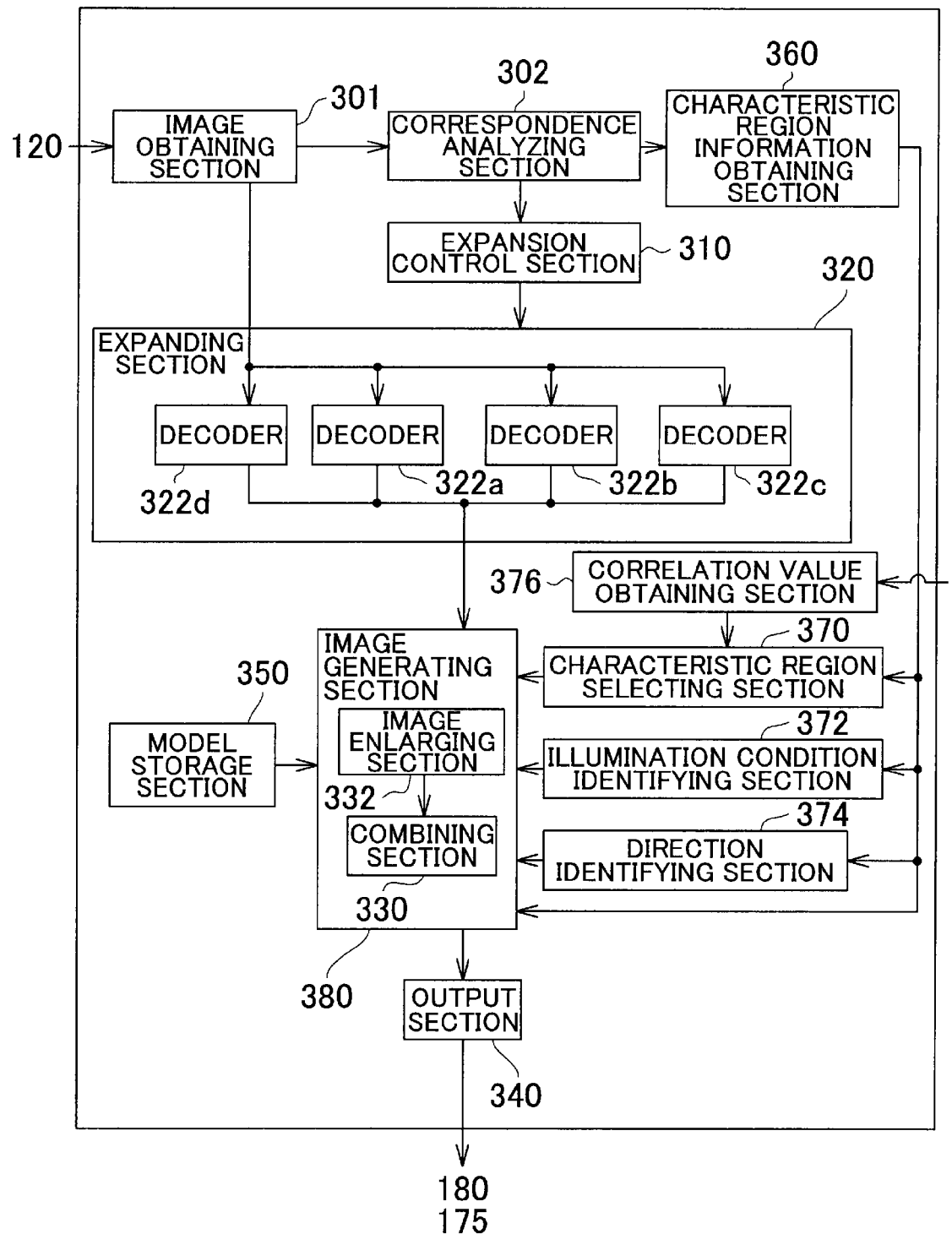
FIG. 14 shows an example of a block configuration of an image processing apparatus 170 in another configuration.

FIG. 14 shows another example of a block configuration of an image processing apparatus 170. The image processing apparatus 170 in the present configuration renders a characteristic region in high image quality, by performing super resolution processing on the image of the characteristic region. The image processing apparatus 170 includes an image obtaining section 301, a correspondence analyzing section 302, an expansion control section 310, an expanding section 320, an image generating section 380, a characteristic region information obtaining section 360, a characteristic region selecting section 370, an illumination condition identifying section 372, a direction identifying section 374, a correlation value obtaining section 376, a model storage section 350, and an output section 340. The image generating section 380 includes an image enlarging section 332 and a combining section 330.

The image obtaining section 301 obtains a compressed moving image compressed by the compression section 230. Specifically, the image obtaining section 301 obtains a compressed moving image including a plurality of characteristic region moving images and a background region moving image. More specifically, the image obtaining section 301 obtains a compressed moving image to which characteristic region information is attached. Note that the compressed moving image may be an example of an input moving image directed to the image processing apparatus 170. In addition, the captured image included in the compressed moving image as a moving image constituting image may be an example of an input image directed to the image processing apparatus 170. In this way, the image obtaining section 301 obtains the captured image whose image quality has been lowered by the compression section 230, as an input image.

The correspondence analyzing section 302 separates the compressed moving image into a plurality of characteristic region moving images and a background region moving image, and characteristic region information, and supplies the plurality of characteristic region moving images and the background region moving image to the expanding section 320. In addition, the correspondence analyzing section 302 analyzes the characteristic region information, and supplies the positions of the characteristic regions and the characteristic types to the expansion control section 310 and the characteristic region information obtaining section 360. In this way, the characteristic region information obtaining section 360 can obtain the information indicating each characteristic region in each of a plurality of captured images (i.e., information indicating the position of each characteristic region).

The expansion control section 310 controls the expanding processing by the expanding section 320, according to the position of the characteristic region and the characteristic type obtained from the correspondence analyzing section 302. For example, the expansion control section 310 controls the expanding section 320 to expand each region of a moving image represented by the compressed moving image, according to a compression method adopted by the compression section 230 in compressing each region of the moving image according to the position of the characteristic region and the characteristic type.

The following explains the operation of each constituting element of the expanding section 320. The expanding section 320 includes a plurality of decoders 322*a-d* (hereinafter collectively referred to as "decoder 322"). The decoder 322 decodes one of the plurality of characteristic region moving images and the background region moving image, which have been encoded. Specifically, the decoders 322*a*, 322*b*, 322*c*, and 322*d* respectively decode the first, second, third characteristic region moving images and a background region moving image. The expanding section 320 supplies the first, second, third characteristic region moving images and the background region moving image, which have been decoded, to the image generating section 380.

The image generating section 380 generates a single moving image for display based on the first, second, third characteristic region moving images, the background region moving image, and the characteristic region information. The output section 340 then outputs the characteristic region information obtained from the correspondence analyzing section 302 and the moving image for display to the display apparatus 180 or to the image DB 175. Note that the image DB 175 may record, in a nonvolatile recording medium such as a hard disk, the position, the characteristic type, and the number of characteristic region(s) indicated by the characteristic region information, in association with information identifying the captured image included in the moving image for display.

The characteristic region selecting section 370 selects, from characteristic regions in each of a plurality of captured images, a first characteristic region and a second characteristic region having correlation higher than a predetermined value. Specifically, the correlation value obtaining section 376 obtains a threshold value related to the correlation. Then, the characteristic region selecting section 370 selects, from among the characteristic regions in each of the plurality of moving image constituting images, a first characteristic region and a second characteristic region having correlation higher than the threshold value obtained by the correlation value obtaining section 376.

For example, the characteristic region selecting section 370 may select, from among characteristic regions detected from each of a plurality of captured images, a first characteristic region and a second characteristic region having a degree of matching in image higher than a predetermined value.

The characteristic region selecting section 370 may also select a first characteristic region and a second characteristic region based on the positions of the characteristic regions in each of the plurality of a plurality of captured images. For example, the characteristic region selecting section 370 may select a first characteristic region and a second characteristic region, whose moving speed changes in an amount smaller than a predetermined value in the compressed moving image, based on the amount of change in positions of the characteristic regions across the plurality of captured images. In addition, the characteristic region selecting section 370 may select a first characteristic region and a second characteristic region, whose moving direction changes in an amount smaller than a predetermined value in an input moving image, based on the direction of change in position of the characteristic regions across the plurality of captured images. The characteristic region selecting section 370 supplies the information indicating the first characteristic region and the second characteristic region having been selected, to the image generating section 380.

The image generating section 380 then generates a high image quality image having a higher resolution than the image of the first characteristic region and the image of the second characteristic region, using the image of the first characteristic region, the image of the second characteristic region, and the difference in position of the first characteristic region and the second characteristic region. For example, the image generating section 380 combines the image of the first characteristic region and the image of the second characteristic region based on the difference in position, to generate a high image quality image. For example, the image generating section 380 generates a high image quality image by overlapping the image of the first characteristic region and the image of the second characteristic region by displacing them by the difference in position.

Note that the characteristic region selecting section 370 may select three or more characteristic regions having correlation higher than a predetermined value, from among the characteristic regions detected from each of a plurality of captured images. The image generating section 380 may generate a high image quality image having a resolution higher than the images of the three or more characteristic regions, using the images of the three or more characteristic regions and the difference in position of the three or more characteristic regions.

The image enlarging section 332 enlarges the image of the region other than the characteristic region in a captured image to the same resolution as the high image quality image. The combining section 330 combines the image obtained by the image enlarging section 332 and the high image quality image, to generate a single captured image as a moving image constituting image of a moving image for display. In this way, the image generating section 380 enlarges the image of the region other than the characteristic region in the captured image to the same resolution as the high image quality image, and combines the enlarged image and the high image quality image, thereby generating a single captured image. The image generating section 380 generates a moving image for display which includes a plurality of captured images as moving image constituting images, by performing the above-explained processing to each of the plurality of captured images.

Note that the image generating section 380 may generate a high image quality image by adapting the image of the object included in the characteristic region to a mathematical model. Specifically, the model storage section 350 stores a model representing an object using a feature parameter. Specifically, the model storage section 350 stores a model representing an object using a statistical feature parameter. For example, the model storage section 350 stores a model representing an object by a principal component (e.g., principal component vector) based on a principal component analysis.

Note that the model storage section 350 may store a model expressing the form of an object by a principal component based on a principal component analysis. In addition, the model storage section 350 may store a model expressing the color of an object by a principal component based on a principal component analysis.

The image generating section 380 adapts the image of the object included in the characteristic region in the captured image to a model, to convert the image of the object included in the characteristic region in the captured image to a high image quality image having a higher image quality than the captured image.

The model storage section 350 stores models of an object viewed from respectively different directions, in association with the respective directions. The direction identifying section 374 identifies the direction in which the object in the characteristic region in the captured image has been captured. Then, the image generating section 380 may convert, into a high image quality image, the image of the object included in the characteristic region in the captured image, by adapting it to the model stored in the model storage section 350 in association with the direction identified by the direction identifying section 374.

The model storage section 350 also stores models of an object illuminated in different illumination conditions, in association with the respective illumination conditions. The illumination condition identifying section 372 identifies the illumination condition under which the object captured in the characteristic region of the input image has been illuminated. Then, the image generating section 380 converts, into a high image quality image, the image of the object included in the characteristic region of the input image, by adapting it to the model stored in the model storage section 350 in association with the illumination condition identified by the illumination condition identifying section 372. In this way, the image generating section 380 generates a high image quality image having a resolution higher than the inputted captured image, by adapting the image of the object included in the characteristic region in the inputted captured image to a model.

The output section 340 outputs an image including the high image quality image and the image other than the characteristic region. Specifically, the output section 340 outputs a moving image for display that includes, as a moving image constituting image, a captured image obtained by the combining section 330 in the above-explained manner.

Figure 15:
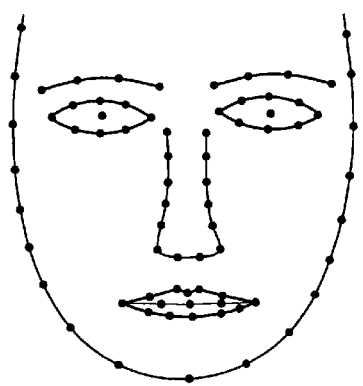
FIG. 15 shows an example of a characteristic point in a human face.

FIG. 15 shows an example of a characteristic point in a human face. As explained above with reference to FIG. 14, the model storage section 350 stores a model expressing an object using a feature parameter. The following explains a method of utilizing an AAM method in generating the model of a face of a person that is an example of the object, as an example of a generating method of generating a model stored by the model storage section 350.

"n" characteristic points representing the facial form are set with respect to each of the plurality of facial images (hereinafter referred to as "sample image") representing a facial portion of a person as a sample as shown in FIG. 15. Note that the number of characteristic points is assumed to be smaller than the pixel number of the facial image. Each characteristic point may be determined in advance to show a portion of the face such that the first characteristic point represents the left end of the left eye, the eleventh characteristic point represents the center between the eye brows, and so on. In addition, each characteristic point may be set manually, or automatically by recognition processing.

Then, based on the characteristic points set in each sample image, the average form of the face is calculated. Specifically, the average of the positional coordinates for each characteristic point showing the same portion is obtained in each sample image. Then, the principal component analysis is performed based on the positional coordinates of the characteristic points representing the facial form in each sample image and its average form. As a result, a facial form S can be expressed as $S = S_0 + \Sigma p_i b_i$ (i=1−n).

Here, "S" represents a form vector represented by arranging the positional coordinates of each characteristic point of the facial form $(x1, y1, \ldots, x_n, y_n)$, "$S_0$" represents an average facial form vector represented by arranging the positional coordinates of each characteristic point in the average facial form, "$p_i$" represents an eigenvector showing the i-th principal component of the facial form obtained by the principal component analysis, and "$b_i$" represents the weighting factor for each eigenvector $p_i$.

Figure 16A:
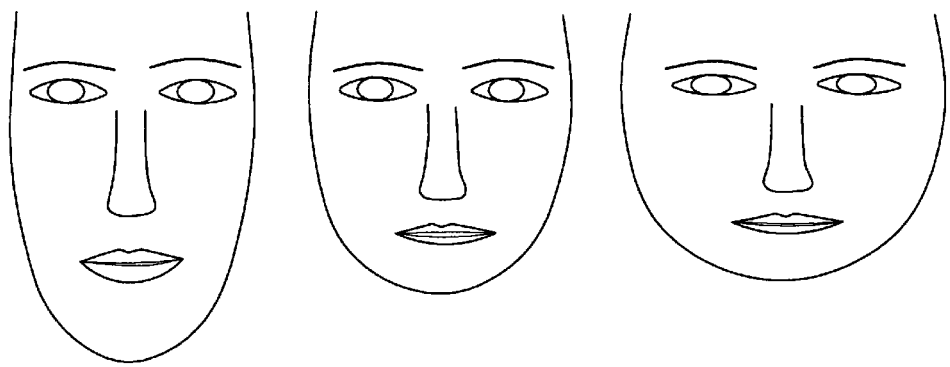
FIG. 16A and FIG. 16B schematically show an example of change in facial form when a weighting factor b is changed.
Figure 16B:
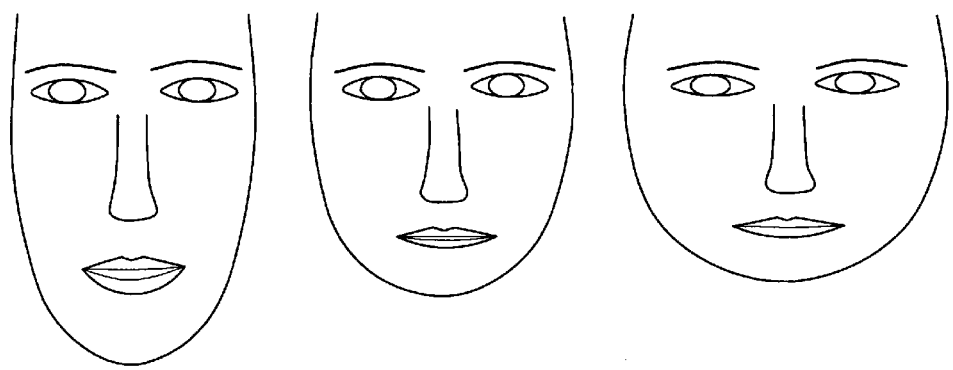

FIG. 16A and FIG. 16B schematically show an example of change in facial form when a weighting factor b is changed. The present drawings schematically show the change in facial form in changing the values of the weighting factors $b_1$ and $b_2$ with respect to the eigenvectors $p_1$, $p_2$ of the upper two principal components obtained by the principal component analysis. FIG. 16A shows change in facial form when the weighting factor $b_1$ is changed, and FIG. 16B shows change in facial form when the weighting factor $b_2$ is changed. In each case of FIG. 16A and FIG. 16B, the center of three facial forms for each principal component shows an average facial form.

In this case, the component contributing to the outline form of the face is extracted as the first principal component, as a result of the principal component analysis. By changing the weighting factor $b_1$, the facial form changes from a) the thin face shown in the left end to a) the round face shown in the right end. As the second principal component, the components contributing to the open/close state of the mouth and the length of the chin are extracted, and so by changing the weighting factor $b_2$, the facial form changes from b) the long chin with the mouth open in the left end to b) the short chin with the mouth closed in the right end. Note that each person may interpret differently as to which element of form a principal component contributes. The principal component analysis enables to extract a principal component expressing a larger difference in form in each used sample image, as a lower-order principal component.

FIG. 17 shows an example of an image obtained by converting a sample image into an average facial form. Each sample image is converted (warped) into an average facial form. Concretely, the amount of shift between each sample image and an average facial form is calculated for each characteristic point. Then using thus calculated amount of shift, the amount of shift of each sample image to an average facial form for each pixel is calculated, to warp each sample image to an average facial form for each pixel.

Then, the principal component analysis is conducted using, as a variable, the pixel value of the color component of R, G, B of each pixel of each sample image after conversion into an average facial form. As a result, the pixel value of the color component of R, G, B in the average facial form of an arbitrary facial image can be approximated using an expression $A = A_0 + \Sigma q_i \lambda_i$ (i=1−m).

Here, "A" represents the vector (r1, g1, b1, r2, g2, b2, . . . , rm, gm, bm) represented by arranging each pixel value of R, G, B color components of each pixel in an average form. Note that "r," "g," and "b" represent the pixel value of R, G, B color components respectively, 1-m represent a suffix identifying each pixel, and "m" represents the total number of pixels in the average facial form. Note that the order of arrangement of the vector components is not limited as stated above.

In addition, $A_0$ represents an average vector represented by arranging the average of each pixel value of R, G, B color components of each pixel of each sample image in the average facial form, $q_i$ represents an eigenvector representing i-th principal component for the pixel value of R, G, B color components of the face obtained by the principal component analysis, and $\lambda_i$ represents a weighting factor for each eigenvector $q_i$.

FIG. 18A and FIG. 18B schematically show an example of change in pixel value when a weighting factor q is changed. The present drawings schematically show the change in pixel value of the face in changing the values of the weighting factors $\lambda_1$ and $\lambda_2$ with respect to the eigenvectors $q_1$, $q_2$ of the upper two principal components obtained by the principal component analysis. FIG. 18A shows change in pixel value when the weighting factor $\lambda_1$ is changed, and FIG. 18B shows change in pixel value when the weighting factor $\lambda_2$ is changed. In each case of FIG. 18A and FIG. 18B, the center of three facial forms for each principal component shows an average pixel value.

In the present example, the component contributing whether there is beards is extracted as the first principal component, as a result of the principal component analysis. By changing the weighting factor $\lambda_1$, the face changes from a) the beardless face shown in the left end to a) the face with thick beards shown in the right end. As the second principal component, the component contributing to the thickness of the eyebrow is extracted, and so by changing the weighting factor $\lambda_2$, the face changes from b) the face with scarce eyebrow at the left end to b) the face with thick eyebrow at the right end.

The processing explained with reference to FIG. 16 through FIGS. 18A-18B enables to generate the facial model. The model represents a face by a plurality of eigenvectors pi representing the facial form and an eigenvector $q_i$ representing the pixel value of the face in the average facial form. The summation value of each eigenvector of the model is substantially smaller than the number of pixels forming the facial image. Note that in the above-stated example, different weighting factors $b_i$, $\lambda_i$ are used for the facial form and the pixel values of R, G, B color components to express different facial images, since there is correlation between variations of the facial form and the color component pixel values, it is also possible to perform principal component analysis on the feature parameter including both of the characteristic point and the pixel value.

The following shows an example of processing performed by the image generating section 380 to render into a high resolution the image of the characteristic region using the model stored in the model storage section 350. The image generating section 380 normalizes the input facial image included in the characteristic region, to calculate the pixel value of the R, G, B color component in the average facial form. Note that the input facial image is not always taken from the front, or may be taken under an illumination condition different from the illumination condition under which the sample image was taken. Therefore, not limited to processing to align the characteristic points of the front face as stated above, the normalization in this specification also includes converting into the facial image captured under the same image capturing environment as that of the sample image, such as conversion processing for converting the direction of the input facial image as taken from the slanting direction into the facial image as taken from the front, and shadow removal processing to remove the effect of the shadow due to illumination.

The image generating section 380 calculates the weighting factor $\lambda_i$ by projecting the pixel value difference from the average face onto the principal component vector $q_i$. Specifically, the image generating section 380 can calculate the weighting factor $\lambda_i$ by the inner product with the principal component vector $q_i$. Then, the image generating section 380 uses the obtained weighting factor $\lambda_i$, the pixel value $A_0$ of the average face, and the principal component vector $q_i$, to calculate the pixel value "A" in the average facial form.

In addition, the image generating section 380 calculates the characteristic point S of the face using the similar processing as the above-described calculation of the pixel value A. Specifically, the image generating section 380 calculates the weighting factor $b_i$ by projecting the difference in position of the characteristic points from the average face on the principal component vector $p_i$. Then, the image generating section 380 calculates the characteristic point "A" using the obtained weighting factor $b_i$, the characteristic point $S_0$ of the average face, and the principal component vector $p_i$. Then, the image generating section 380 performs inverse conversion of the above-described normalization processing excluding the processing to align the characteristic points, onto the image represented by the pixel value "A" and the characteristic point "A."

According to the above-described processing, the image generating section 380 generates a high image quality image having a higher image quality than the image quality of the captured image, based on the image of the characteristic region in the captured image outputted from the output section 207. Specifically, the image generating section 380 may generate an image of a higher resolution, a sharper image, an image having less noise, an image having more number of gradations, or an image having a larger number of colors, than the captured image outputted from the output section 207.

FIG. 19 shows, in table format, an exemplary model stored in a model storage section 350. The model storage section 350 stores a model for each combination of expression and direction. Exemplary expressions include faces in each state of delight, anger, sorrow, and pleasure, and a sober face, and exemplary directions include front, upper, lower, right, left, and back. The image generating section 380 can identify the expression of the face and the direction of the face, based on the facial image included in the characteristic region, and perform the above-explained reconstruction processing using the model stored in the model storage section 350 in association with the identified combination of expression and direction.

Note that the image generating section 380 may identify the expression from the form of the mouth and/or the eyes, and may identify the facial direction based on such as the positional relation of the eyes, the mouth, the nose, and the ears. Note that the image processing apparatus 120 may be used to identify the facial expression and the facial direction, and the output section 207 may be used to output the facial expression and the facial direction in association with the captured image.

Moreover, the model storage section 350 may store the model in association with the illumination condition, as well as in association with the facial expression and the facial direction. For example, the model storage section 350 may store the model in association with the strength and the direction of the illumination. The image generating section 380 may identify the illumination condition for the face based on the facial image included in the characteristic region. For example, the image generating section 380 may identify the strength and direction of the illumination based on the position and size of the shadow, and perform the above-explained reconstruction processing using the model stored in the model storage section 350 in association with the identified strength and direction of the illumination.

The above-described example has stated generation of a model for expressing the entire face and reconstruction using the model. However not limited to the model for the entire face, the image processing system 10 may also use a model for each portion of a face. The image processing system 10 may also use a model of a face different for each sex and/or race (or each portion of these faces). Furthermore, not limited to a human model as stated above, the image processing system 10 may store the model for each type of object under monitoring (e.g., vehicle and ship) by the image processing system 10. The image generating section 380 may perform reconstruction by selecting a model according to the type of object included in the characteristic region. The types of object may be detected in the image processing apparatus 120 to be transmitted to the image processing apparatus 170 in association with the captured image.

As explained above, the model storage section 350 may store models of different types of object in association with the types. The characteristic region information obtaining section 360 obtains information indicating the type of object included in the characteristic region in the inputted image. The image generating section 380 converts, into a high image quality image, the image of the object included in the characteristic region in the captured image, by adapting it to the model stored in the model storage section 350 in association with the type of the object included in the characteristic region obtained by the characteristic region information obtaining section 360.

As explained above, the image processing system 10 performs super resolution processing on the characteristic regions using a model, while not performing the super resolution processing on the background region. Therefore, the amount of operation required by the super resolution processing can be substantially reduced. In addition, regions having less importance such as the background region will not be rendered in high image quality, which helps reduce the amount of image data. In addition, according to the image processing system 10, the information identifying the characteristic regions is transmitted to the image processing apparatus 170, which prevents performance of super resolution mistakenly onto the background region only including a low image quality image.

As explained above, the model storage section 350 stores learning data for each portion (e.g., eyes, nose, and mouth) of a face which is an example of the information identifying a type of object. Here, the learning data may include, other than the models described above, a low frequency component and a high frequency component of the image of the object respectively extracted from a multiple sample images of the object. In this way, the model storage section 350 functions as an object image information storage section that stores a high frequency component of an image of an object, in association with its object type. Here, for each type of the plurality of objects, the low frequency component of the image of the object can be clustered into a plurality of clusters, by means of K-means or the like. In addition, a representative low frequency component (e.g., barycenter value) can be determined for each cluster.

The image generating section 380 extracts the low frequency component from the image of the object included in the captured image. The image generating section 380 identifies the cluster whose value matching the extracted low frequency component is determined as the representative low frequency component. The image generating section 380 identifies the cluster of the high frequency component associated with the low frequency component included in the identified cluster. In this way, the image generating section 380 can identify the cluster of the high frequency component correlated to the low frequency component extracted from the object included in the captured image. The image generating section 380 can convert the image of the object into higher image quality, using a high frequency component representative of the identified cluster of high frequency component. For example, the image generating section 380 may add, to the image of the object, the high frequency component selected for each object with a weight corresponding to the distance up to the processing target position on the face from the center of each object. Here, the representative high frequency component may be generated by closed-loop learning. In this way, the image generating section 380 can sometimes render the image of the object into high image quality with higher accuracy, since it selects desirable learning data from among the learning data generated by performing learning according to each object.

In this way, the image processing apparatus 170 can reconstruct the image of a characteristic region using a principal component analysis (PCA). Note that examples of the image reconstruction method by means of the image processing apparatus 170 and the learning method thereof include, other than the learning and image reconstruction by means of principal component analysis (PCA), locality preserving projection (LPP), linear discriminant analysis (LDA), independent component analysis (ICA), multidimensional scaling (MDS), support vector machine (SVM) (support vector regression), neutral network, Hidden Markov Model (HMM), Bayes estimator, Maximum a posteriori, Iterative Back Projection Method, Wavelet Conversion, locally linear embedding (LLE), Markov random field (MRF), and so on.

As explained so far, the image processing apparatus 170 renders the image of a characteristic region into high image quality, by performing super resolution processing on the image of the characteristic region. Note that the image processing apparatus 170 may perform combined processing of the processing of the image processing apparatus 170 explained with reference to FIG. 1 through FIG. 13 and the processing of the image processing apparatus 170 explained with reference to FIG. 14 through FIG. 19. For example, the image processing apparatus 170 may record, in the image DB 175, the captured images obtained by performing the super resolution processing on the characteristic regions explained with reference to FIG. 14 through FIG. 19, in association with the information identifying the number, the position, and the size of the characteristic regions, and the type of the objects included in the characteristic regions, as explained in FIG. 1 through FIG. 13. Then, as explained with reference to FIG. 1 through FIG. 13, in response to an instruction from an observer, the image processing apparatus 170 may display the images of the characteristic regions at the same position with the same size, based on the information identifying the number, the position, and the size of the characteristic regions, and the type of the objects included in the characteristic regions.

Figure 20:
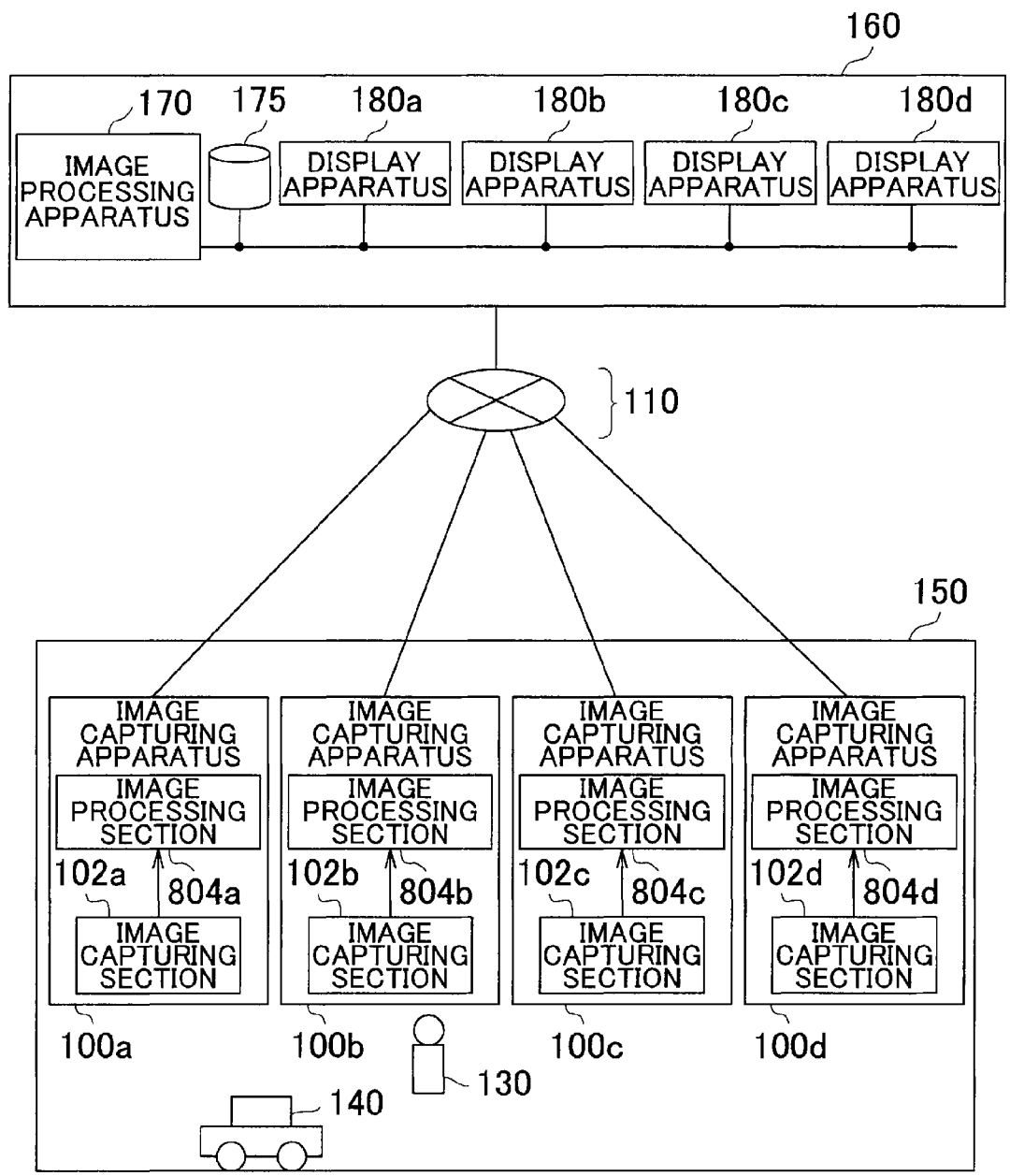
FIG. 20 shows an example of an image processing system 20 according to another embodiment.

FIG. 20 shows an example of an image processing system 20 according to another embodiment. The configuration of the image processing system 20 in the present embodiment is the same as the configuration of the image processing system 10 of FIG. 1, except that the image capturing apparatuses 100a-d respectively include image processing sections 804a-d (hereinafter collectively referred to as "image processing section 804").

The image processing section 804 includes all the constituting element of the image processing apparatus 120 except for the image obtaining section 250. The function and operation of each constituting element of the image processing section 804 may be substantially the same as the function and operation of each constituting element of the image processing apparatus 120, except that each constituting element of the image processing section 804 processes the captured moving image captured by the image capturing section 102 instead of processing the captured moving image obtained by expanding processing performed by the compressed moving image expanding section 202. The image processing system 20 having the stated configuration can also obtain substantially the same effect as the effect obtained by the image processing system 10 explained above with reference to FIG. 1 through FIG. 13.

Note that the image processing section 804 may obtain, from the image capturing section 102, a captured moving image including a plurality of captured images represented in RAW format, and compress the plurality of captured images represented in RAW format in the obtained captured moving image, as they are in the RAW format. Note that the image processing section 804 may detect one or more characteristic regions from a plurality of captured images represented in RAW format. In addition, the image processing section 804 may compress a captured moving image including a plurality of compressed captured images represented in RAW format. The image processing section 804 can perform compression using a compression method explained above as the operation of the image processing apparatus 120 with reference to FIG. 1 through FIG. 19. The image processing apparatus 170 can obtain the plurality of captured images represented in RAW format, by expanding the moving image obtained from the image processing section 804. The image processing apparatus 170 enlarges, for each region, the plurality of captured images represented in RAW format obtained by expansion, and performs synchronization processing for each region. During this operation, the image processing apparatus 170 may perform higher definition synchronization processing on the characteristic regions than in the region other than the characteristic region.

Then, the image processing apparatus 170 may perform such super resolution processing as explained above with reference to FIG. 14 through FIG. 19, onto the image of the characteristic region in the captured image obtained by the synchronization processing. In the explanation of FIG. 1 through FIG. 19, the image processing apparatus 170 has calculated the weighting factor in the super resolution processing. In this case, the image of the object included in the characteristic region can also be represented using the principal component vector and the weighting factor. However, the amount of data of these weighting factor and principal component vector is substantially smaller than the amount of the pixel data included in the image of the object itself. In view of this, the image processing section 804 may calculate the above-explained weighting factor from the image of the object included in the characteristic region, in the compression processing for compressing the images of the characteristic regions included in the plurality of captured images obtained from the image capturing section 102. That is, the image processing section 804 may compress the image of the object included in the characteristic region by expressing it by the principal component vector and the weighting factor. Then, the image processing section 804 may transmit the principal component vector and the weighting factor to the image processing apparatus 170. In the image processing apparatus 170, the image of the object included in the characteristic region can be reconstructed using the weighting factor and the principal component vector obtained from the image processing section 804 as explained above.

In this way, the image processing section 804 may calculate the value of the feature parameter in the model representing the object included in the image of the characteristic region, by adapting the image of the object included in the image of the characteristic region in the captured image to the model representing the object by the feature parameter. Then, the image processing section 804 may output the calculated value of the feature parameter and the image of the region other than the characteristic region. Then, the image processing apparatus 170 may generate the image of the object by adapting the value of the feature parameter obtained from the image processing section 804 to the model, and generate a single captured image using the generated image of the object and the image of the region other than the characteristic region.

Figure 21:
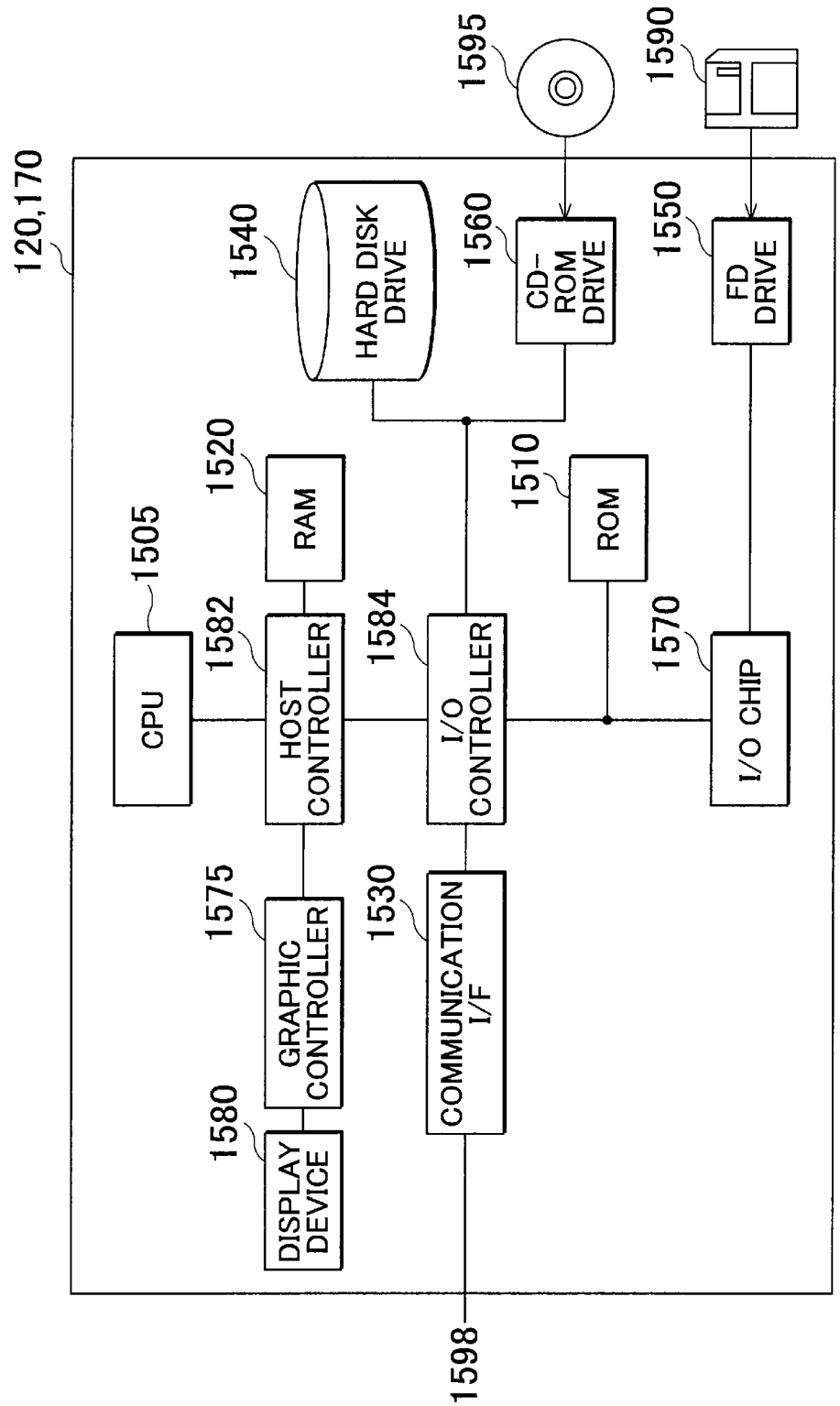
FIG. 21 shows an example of a hardware configuration of an image processing apparatus 120 and an image processing apparatus 170.

FIG. 21 shows an example of an image processing system 120 and an image processing apparatus 170 according to an embodiment. The image processing system 120 and the image processing apparatus 170 include a CPU peripheral section, an input/output section, and a legacy input/output section. The CPU peripheral section includes a CPU 1505, a RAM 1520, a graphic controller 1575, and a display device 1580 connected to each other by a host controller 1582. The input/output section includes a communication interface 1530, a hard disk drive 1540, and a CD-ROM drive 1560, all of which are connected to the host controller 1582 by an input/output controller 1584. The legacy input/output section includes a ROM 1510, a flexible disk drive 1550, and an input/output chip 1570, all of which are connected to the input/output controller 1584.

The host controller 1582 is connected to the RAM 1520 and is also connected to the CPU 1505 and the graphic controller 1575 accessing the RAM 1520 at a high transfer rate. The CPU 1505 operates to control each section based on programs stored in the ROM 1510 and the RAM 1520. The graphic controller 1575 obtains image data generated by the CPU 1505 or the like on a frame buffer provided inside the RAM 1520 and displays the image data in the display device 1580. Alternatively, the graphic controller 1575 may internally include the frame buffer storing the image data generated by the CPU 1505 or the like.

The input/output controller 1584 connects the communication interface 1530 serving as a relatively high speed input/output apparatus, the hard disk drive 1540, and the CD-ROM drive 1560 to the host controller 1582. The hard disk drive 1540 stores the programs and data used by the CPU 1505. The communication interface 1530 transmits or receives programs and data by connecting to the network communication apparatus 1598. The CD-ROM drive 1560 reads the programs and data from a CD-ROM 1595 and provides the read programs and data to the hard disk drive 1540 and to the communication interface 1530 via the RAM 1520.

Furthermore, the input/output controller 1584 is connected to the ROM 1510, and is also connected to the flexible disk drive 1550 and the input/output chip 1570 serving as a relatively low speed input/output apparatus. The ROM 1510 stores a boot program executed when the information processing apparatus 120 and the information processing apparatus 170 start up, a program relying on the hardware of the information processing apparatus 120 and the information processing apparatus 170, and so on. The flexible disk drive 1550 reads programs or data from a flexible disk 1590 and supplies the read programs or data to the hard disk drive 1540 and to the communication interface 1530 via the RAM 1520. The input/output chip 1570 is connected to a variety of input/output apparatuses via the flexible disk drive 1550, and a parallel port, a serial port, a keyboard port, a mouse port, or the like, for example.

A program executed by the CPU 1505 is supplied by a user by being stored in a recording medium such as the flexible disk 1590, the CD-ROM 1595, or an IC card. The program may be stored in the recording medium either in a decompressed condition or a compressed condition. The program is installed via the recording medium to the hard disk drive 1540, and is read by the RAM 1520 to be executed by the CPU 1505. The program executed by the CPU 1505 causes the image processing apparatus 120 to function as each constituting element of the image processing apparatus 120 explained with reference to FIG. 1 through FIG. 20, and causes the image processing apparatus 170 to function as each constituting element of the image processing apparatus 170 explained with reference to FIGS. 1 through 20 respectively.

The programs shown above may be stored in an external storage medium. In addition to the flexible disk 1590 and the CD-ROM 1595, an optical recording medium such as a DVD or PD, a magnetooptical medium such as an MD, a tape medium, a semiconductor memory such as an IC card, or the like can be used as the recording medium. Furthermore, a storage apparatus such as a hard disk or a RAM disposed in a server system connected to a dedicated communication network or the Internet may be used as the storage medium and the programs may be provided to the computer 1500 functioning as the image processing apparatuses 120 and 170 via the network. In this way, the computer 1500 controlled by a program functions as the image processing apparatuses 120 and 170.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An image processing system comprising:
an image obtaining section that obtains a moving image;
a characteristic region information obtaining section that obtains information indicating positions of characteristic regions in a plurality of moving images constituting images included in the moving image; and
an image generating section that generates display images having substantially the same size as each other, by reducing or enlarging each of images of the characteristic regions included in the plurality of moving images constituting images in the moving image, based on the positions indicated by the information obtained by the characteristic region information obtaining section,
a characteristic region detecting section that detects the characteristic regions from the plurality of moving images constituting images included in the moving image, wherein
the characteristic region information obtaining section obtains the information indicating the positions of the characteristic regions detected by the characteristic region detecting section,
an output section that outputs information indicating positions of the characteristic regions detected by the characteristic region detecting section, in association with the plurality of moving images constituting images included in the moving image, wherein
the characteristic region information obtaining section obtains the information indicating the positions of the characteristic regions outputted by the output section in association with the plurality of moving images constituting images included in the moving image,
an instruction obtaining section that obtains an instruction to display the display image, wherein
the output section records the moving image in association with the information indicating the positions of the plurality of characteristic regions detected by the characteristic region detecting section, and
the image generating section, when the instruction obtaining section has obtained the instruction, generates the display images having substantially the same size as each other, by reducing or enlarging each of the images of the characteristic regions included in the plurality of moving images constituting images included in the moving image based on the positions of the plurality of characteristic regions indicated by the information recorded in association with the moving image,
a compression section that compresses the moving image, wherein
the output section records the moving image compressed by the compression section, in association with the information indicating the positions of the plurality of characteristic regions detected by the characteristic region detecting section,
an expanding section that expands the compressed moving image, wherein
the output section records the information indicating the positions of the plurality of characteristic regions detected by the characteristic region detecting section, in association with information respectively identifying the moving image constituting images included in the moving image from which the characteristic regions are extracted,
the expanding section, when the instruction obtaining section has obtained the instruction, identifies a plurality of the moving images constituting images included in the moving image identified by the information recorded in association with the information indicating the positions of the plurality of characteristic regions, and expands a partial moving image of the compressed moving image, the partial moving image corresponding to a period of time including a display timing at which the plurality of moving images constituting images included in the moving image identified by the recorded information are displayed, and
the image generating section, when the instruction obtaining section has obtained the instruction, generates the display images, by reducing or enlarging each of images of a plurality of characteristic regions included in a plurality of moving images constituting images included in the moving image included in the partial moving image expanded by the expanding section, based on the positions of the plurality of characteristic regions indicated by the information recorded in association with the compressed moving image.

2. The image processing system according to claim 1, wherein
the characteristic region detecting section detects the characteristic regions having different characteristic types from each other, from the plurality of moving images constituting images included in the moving image, and
the image generating section generates the display images depending on the respective characteristic types.

3. The image processing system according to claim 2, wherein
the image generating section generates the display images having sizes corresponding to the respective characteristic types.

4. The image processing system according to claim 1, further comprising:
a characteristic region selecting section that selects, from among the plurality of characteristic regions, characteristic regions matching a predetermined condition, wherein
the image generating section generates the display images by reducing or enlarging images of the characteristic regions selected by the characteristic region selecting section.

5. The image processing system according to claim 4, wherein
the characteristic region detecting section detects the plurality of characteristic regions having different characteristic types from each other, from the plurality of moving images constituting images included in the moving image, and
the characteristic region selecting section selects, from among the plurality of characteristic regions having different characteristic types from each other, characteristic regions having a predetermined characteristic type.

6. The image processing system according to claim 5, wherein
the characteristic region detecting section detects the plurality of characteristic regions including different objects from each other, from the plurality of moving images constituting images included in the moving image, and
the characteristic region selecting section selects, from among the plurality of characteristic regions including different objects from each other, characteristic regions including a predetermined object.

7. The image processing system according to claim 4, wherein
the characteristic region selecting section selects, from among the plurality of characteristic regions, characteristic regions detected from the moving image over a period of time longer than a predetermined time length.

8. The image processing system according to claim 4, wherein
the characteristic region selecting section selects, from among the plurality of characteristic regions, characteristic regions having correlation higher than a predetermined value.

9. The image processing system according to claim 1, wherein
the image generating section generates the display images simultaneously and displays the display images of the plurality of characteristic regions in predetermined different positions from each other.

10. The image processing system according to claim 9, wherein
the image generating section generates the display images simultaneously and displays the display the images of the plurality of characteristic regions in the predetermined different positions respectively corresponding to display timings in the moving image.

11. The image processing system according to claim 1, the image generating section generates a moving image including the display images.

12. The image processing system according to claim 1, wherein
the image generating section generates the display images having sizes respectively corresponding to the positions of the characteristic regions, by reducing or enlarging each of the images of the characteristic regions.

13. The image processing system according to claim 12, wherein
the image generating section generates the display images having sizes respectively corresponding to positions of subjects in a real space represented by positions of the characteristic regions, by reducing or enlarging each of the images of the characteristic regions.

14. The image processing system according to claim 12, wherein
the image generating section generates the display images having sizes respectively corresponding to sizes of subjects in a real space represented by sizes of the characteristic regions, by reducing or enlarging each of the images of the characteristic regions.

15. The image processing system according to claim 1, wherein
the compression section compresses the moving image so that the characteristic regions and a region other than the characteristic regions are compressed at different degrees from each other.

16. An image processing system comprising:
an image obtaining section that obtains a moving image;
a characteristic region information obtaining section that obtains information indicating positions of characteristic regions in a plurality of moving images constituting images included in the moving image; and
an image generating section that generates display images displaying images of the characteristic regions included in the plurality of moving images constituting images in the moving image in substantially the same position as each other, based on the positions indicated by the information obtained by the characteristic region information obtaining section,
a characteristic region detecting section that detects the characteristic regions from the plurality of moving images constituting images included in the moving image, wherein
the characteristic region information obtaining section obtains the information indicating the positions of the characteristic regions detected by the characteristic region detecting section,
an output section that outputs information indicating positions of the characteristic regions detected by the characteristic region detecting section, in association with the plurality of moving images constituting images included in the moving image, wherein
the characteristic region information obtaining section obtains the information indicating the positions of the characteristic regions outputted by the output section in association with the plurality of moving images constituting images included in the moving image, an instruction obtaining section that obtains an instruction to display the display image, wherein the output section records the moving image in association with the information indicating the positions of the plurality of characteristic regions detected by the characteristic region detecting section, and the image generating section, when the instruction obtaining section has obtained the instruction, generates the display images having substantially the same size as each other, by reducing or enlarging each of the images of the characteristic regions included in the plurality of moving images constituting images included in the moving image based on the positions of the plurality of characteristic regions indicated by the information recorded in association with the moving image, a compression section that compresses the moving image, wherein the output section records the moving image compressed by the compression section, in association with the information indicating the positions of the plurality of characteristic regions detected by the characteristic region detecting section, an expanding section that expands the compressed moving image, wherein the output section records the information indicating the positions of the plurality of characteristic regions detected by the characteristic region detecting section, in association with information respectively identifying the moving image constituting images in the moving image from which the characteristic regions are extracted, the expanding section, when the instruction obtaining section has obtained the instruction, identifies a plurality of the moving images constituting images included in the moving image identified by the information recorded in association with the information indicating the positions of the plurality of characteristic regions, and expands a partial image of the compressed moving image, the partial moving image corresponding to a period of time including a display timing at which the plurality of moving images constituting images included in the moving image identified by the recorded information are displayed, and the image generating section, when the instruction obtaining section has obtained the instruction, generates the display images, by reducing or enlarging each of images of a plurality of characteristic regions included in a plurality of moving images constituting images included in the moving image included in the partial moving image expanded by the expanding section, based on the positions of the plurality of characteristic regions indicated by the information recorded in association with the compressed moving image.

17. An image processing system comprising:

an image obtaining section that obtains a moving images;

a characteristic region information obtaining section that obtains information indicating positions of characteristic regions in a plurality of moving images constituting images included in the moving image; and an image generating section that generates display images having substantially the same size as each other, by reducing or enlarging each of images of the characteristic regions included in the plurality of moving images constituting images included in the moving image, based on the positions indicated by the information obtained by the characteristic region information obtaining section, a characteristic region detecting section that detects the characteristic regions from the plurality of moving images constituting images included in the moving image, wherein the characteristic region information obtaining section obtains the information indicating the positions of the characteristic regions detected by the characteristic region detecting section;

a characteristic region selecting section that selects, from among the plurality of characteristic regions, characteristic regions matching a predetermined condition, wherein the characteristic region selecting section selects, from among the plurality of characteristic regions, characteristic regions detected from the moving images which remain in the moving images for a period of time exceeding a predetermined time length, an output section that outputs information indicating positions of the characteristic regions detected by the characteristic region detecting section, in association with the plurality of moving images constituting images included in the moving image, wherein the characteristic region information obtaining section obtains the information indicating the positions of the characteristic regions outputted by the output section in association with the plurality of moving images constituting images included in the moving image;

an instruction obtaining section that obtains an instruction to display the display image, wherein the output section records the moving images in association with the information indicating the positions of the plurality of characteristic regions detected by the characteristic region detecting section, and the image generating section, when the instruction obtaining section has obtained the instruction, generates the display images having substantially the same size as each other, by reducing or enlarging each of the images of the characteristic regions included in the plurality of moving images constituting images based on the positions of the plurality of characteristic regions indicated by the information recorded in association with the moving image a compression section that compresses the moving images, wherein the output section records the moving images compressed by the compression section, in association with the information indicating the positions of the plurality of characteristic regions detected by the characteristic region detecting section, an expanding section that expands the compressed moving image, wherein the output section records the information indicating the positions of the plurality of characteristic regions detected by the characteristic region detecting section, in association with information respectively identifying the image constituting images from which the characteristic regions are extracted, the expanding section, when the instruction obtaining section has obtained the instruction, identifies a plurality of the moving image constituting images included in the moving image identified by the information recorded in association with the information indicating the positions of the plurality of characteristic regions, and expands a partial moving image of the compressed moving image, the partial moving image corresponding to a period of time including a display timing at which the plurality of moving image constituting images identified by the recorded information are displayed, and the image generating section, when the instruction obtaining section has obtained the instruction, generates the display images, by reducing or enlarging each of images of a plurality of characteristic regions included in a plurality of moving image constituting images included in the partial moving image expanded by the expanding section, based on the positions of the plurality of characteristic regions indicated by the information recorded in association with the compressed moving image.

18. The image processing system according to claim 17, wherein the characteristic region detecting section detects the characteristic regions having different characteristic types from each other, from the plurality of moving images constituting images included in the moving image, and the image generating section generates the display images depending on the respective characteristic types.

19. The image processing system according to claim 18, wherein the image generating section generates the display images having sizes corresponding to the respective characteristic types.

20. The image processing system according to claim 17, wherein the image generating section generates the display images by reducing or enlarging images of the characteristic regions selected by the characteristic region selecting section.

21. The image processing system according to claim 20, wherein the characteristic region detecting section detects the plurality of characteristic regions having different characteristic types from each other, from the plurality of moving images constituting images included in the moving image, and the characteristic region selecting section selects, from among the plurality of characteristic regions having different characteristic types from each other, characteristic regions having a predetermined characteristic type.

22. The image processing system according to claim 21, wherein the characteristic region detecting section detects the plurality of characteristic regions including different objects from each other, from the plurality of moving images constituting images included in the moving image, and the characteristic region selecting section selects, from among the plurality of characteristic regions including different objects from each other, characteristic regions including a predetermined object.

23. The image processing system according to claim 20, wherein the characteristic region selecting section selects, from among the plurality of characteristic regions, characteristic regions having correlation higher than a predetermined value.

24. The image processing system according to claim 17, wherein the image generating section generates the display images simultaneously and displays the display images of the plurality of characteristic regions in predetermined different positions from each other.

25. The image processing system according to claim 24, wherein the image generating section generates the display images simultaneously and displays the display the images of the plurality of characteristic regions in the predetermined different positions respectively corresponding to display timings in the moving image.

26. The image processing system according to claim 17, the image generating section generates a moving image including the display images.

27. The image processing system according to claim 17, wherein the image generating section generates the display images having sizes respectively corresponding to the positions of the characteristic regions, by reducing or enlarging each of the images of the characteristic regions.

28. The image processing system according to claim 27, wherein the image generating section generates the display images having sizes respectively corresponding to positions of subjects in a real space represented by positions of the characteristic regions, by reducing or enlarging each of the images of the characteristic regions.

29. The image processing system according to claim 27, wherein the image generating section generates the display images having sizes respectively corresponding to sizes of subjects in a real space represented by sizes of the characteristic regions, by reducing or enlarging each of the images of the characteristic regions.

30. The image processing system according to claim 17, wherein the compression section compresses the moving image so that the characteristic regions and a region other than the characteristic regions are compressed at different degrees from each other.

* * * * *